(12) United States Patent
Iwao

(10) Patent No.: US 12,409,387 B2
(45) Date of Patent: *Sep. 9, 2025

(54) NON-TRANSITORY COMPUTER-READABLE STORAGE MEDIUM HAVING STORED THEREIN GAME PROGRAM, GAME SYSTEM, INFORMATION PROCESSING APPARATUS, AND INFORMATION PROCESSING METHOD

(71) Applicants: Nintendo Co., Ltd., Kyoto (JP); The Pokémon Company, Tokyo (JP)

(72) Inventor: Kazumasa Iwao, Tokyo (JP)

(73) Assignees: Nintendo Co., Ltd., Kyoto (JP); The Pokémon Company, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,883

(22) Filed: May 2, 2024

(65) Prior Publication Data

US 2024/0286040 A1 Aug. 29, 2024

Related U.S. Application Data

(63) Continuation of application No. 17/949,831, filed on Sep. 21, 2022, now Pat. No. 12,246,255.

(30) Foreign Application Priority Data

Dec. 22, 2021 (JP) ................................ 2021-208276

(51) Int. Cl.
A63F 13/56 (2014.01)
A63F 13/577 (2014.01)
A63F 13/58 (2014.01)

(52) U.S. Cl.
CPC ............ *A63F 13/56* (2014.09); *A63F 13/577* (2014.09); *A63F 13/58* (2014.09)

(58) Field of Classification Search
CPC ......... A63F 13/56; A63F 13/58; A63F 13/577
See application file for complete search history.

(56) References Cited

U.S. PATENT DOCUMENTS 7,594,847 B1 9/2009 York
11,077,439 B2 * 8/2021 Savran ................. G01N 27/745
(Continued)

FOREIGN PATENT DOCUMENTS

| JP | 2016-525909 | 9/2016 |
| JP | 2019-195339 | 11/2019 |
| JP | 2020-044134 | 3/2020 |

OTHER PUBLICATIONS

Notice of Reasons for Refusal issued on May 14, 2024 for Japanese Patent Application No. 2024-032983 (with translation), 10 pages.
(Continued)

*Primary Examiner* — Thomas H Henry
(74) *Attorney, Agent, or Firm* — Nixon & Vanderhye PC

(57) ABSTRACT

In an example of a game program, a ground boarding target object or an air boarding target object is selected by a selection operation, and a player character is caused to board the selected boarding target object. If the player character aboard the air boarding target object moves toward the ground, the player character is automatically changed to the state where the player character is aboard the ground boarding target object, and brought into the state where the player character can move on the ground.

23 Claims, 25 Drawing Sheets

(56) References Cited

U.S. PATENT DOCUMENTS

| | | | |
|---|---|---|---|
| 2002/0045470 A1 | 4/2002 | Atsumi | |
| 2004/0157662 A1 | 8/2004 | Tsuchiya | |
| 2005/0059483 A1 | 3/2005 | Borge | |
| 2005/0143174 A1 | 6/2005 | Goldman | |
| 2005/0277455 A1* | 12/2005 | Chudley | A63F 13/12 463/6 |
| 2009/0197658 A1 | 8/2009 | Polchin | |
| 2010/0088124 A1 | 4/2010 | Diefendorf | |
| 2015/0269780 A1* | 9/2015 | Herman | G06T 19/006 345/633 |
| 2016/0129345 A1 | 5/2016 | Seok et al. | |
| 2016/0171835 A1 | 6/2016 | Washington | |
| 2017/0009202 A1 | 1/2017 | Ramsing | |
| 2020/0023273 A1 | 1/2020 | Tsurusaki | |
| 2020/0338451 A1* | 10/2020 | Wang | A63F 13/837 |
| 2023/0082510 A1* | 3/2023 | Wang | A63F 13/5375 463/6 |

OTHER PUBLICATIONS

Parachute, ARK: Survival Evolved Wiki [online], Jun. 2, 2021, [Searched on May 8, 2024], <URL: https://ark.fandom.com/ja/wiki/パラシュート?oldid=20666>, 5 pages.

Swimming, ARK: Survival Evolved Wiki [online], Oct. 25, 2021, [Searched on May 8, 2024], <URL: https://ark.fandom.com/ja/wiki/水泳?oldid=26434>, 6 pages.

Tribe, ARK: Survival Evolved Wiki [online], Dec. 19, 2020, [Searched on May 8, 2024], Internet <URL: https://ark.fandom.com/ja/wiki/トライブ?oldid=13430>, 9 pages.

Wii Game Review "The Legend of Zelda: Skyward Sword", Game Watch [online], Dec. 26, 2011, [Searched on May 8, 2024], Internet <URL: https://game.watch.impress.co.jp/docs/review/501851.html> 10 pages.

[NieR Automata] Movement Technique Explanation [NieR], GameWith [online], Jun. 7, 2019, [Searched on May 8, 2024], Internet <URL: https://gamewith.jp/nierautomata/article/show/143188> 10 pages.

Aug. 29, 2023 Decision to Grant issued in Japanese Patent Application No. 2021-208276, pp. 1-4 [machine translation included].

Fellow, Icarus Online Wiki, Oct. 24, 2015, [date of search: Aug. 15, 2023] https://wikiwiki.ip/icarusonline/FELLOW.

Icarus Online official channel, [Icarus Online] Traveling with fellows, YouTube [online] [video], Jan. 9, 2015, [date of search: Aug. 15, 2023] https://www.youtube.com/watch?v=w1z2XSq05h4.

Team ZRMK, [Ark] atrocious stun capability!? Assassin Baryonyx!! #48 [ [ARK Survival Evolved], YouTube [online] [video], Feb. 2, 2017, [date of search: Aug. 17, 2023] https://www.youtube.com/watch?v=h7y0SfOCSfs.

"Run around the field with Pokémon Ride!", Nintendo Co., Ltd., Available Online at: https://www.pokemon.co.jp/ex/usum/gamesystem/170922_04.html, Retrieved from Online on Sep. 1, 2021, pp. 1-4.

Baron VonGames, The Biggest Battleship Ever Made! Massive Naval Battle! (Ravenfield Best Mods), Sep. 4, 2018, Youtube.com, pp. 1-9, at https://www.youtube.com/watch?v=hPDM0d4ioxI (last visited Sep. 12, 2024), Year: 2018.

YouTube: Marvelous Mab—Eagle Glider—Stormwing Pegasus—Umbrella Magithopter (ArcheAge Unchained), electronically retrieved Jun. 16, 2025, 1 page. https://www.youtube.com/watch?v=MB-TbfJOdg0&t=59s.

YouTube: ArcheAge—How to get a Snowlion Mount, electronically retrieved Jun. 16, 2025, 1 page. https://www.youtube.com/watch?v=NX21JK2VSbo.

YouTube: ArcheAge—Deathmaw/Aquestria Swimspeed vs Landspeed, electronically retrieved Jun. 16, 2025, 1 page. https://www.youtube.com/watch?v=6zJsxFGsM7E.

AMEBA: ArcheAge Official Blog, Aug. 17, 2014, 2 pages. https://ameblo.jp/archeagejp/entry-11911555079.html.

How to Make a 3D Game Using Unity (Kamekume), "How to cause damage when falling from a high place in a Unity game", electronically retrieved Jun. 16, 2025, 4 pages. https://gametukurikata.com/program/tofallfromaheight.

YouTube: ArcheAge Queen Bee Capture 4.5, electronically retrieved Jun. 16, 2025, 1 page. https://www.youtube.com/watch?v=-eH3U9OnvxE.

YouTube: Riders of Icarus CBT—Obtaining First Flying Mount, electronically retrieved Jun. 16, 2025, 1 page. https://www.youtube.com/watch?v=0kWeLXJIf_4?t=69.

YouTube: Taming Windrunner—Riders of Icarus, electronically retrieved Jun. 16, 2025, 1 page. https://www.youtube.com/watch?v=d4EVFbK1lio.

YouTube: Riders of Icarus Snow Area Exploring Flying Mounts 60FPS, electronically retrieved Jun. 16, 2025, 1 page. https://www.youtube.com/watch?v=YF_GQL5CbHw&t=131s.

YouTube: How To Tame Brakarr Gallant Riders Of Icarus, electronically retrieved Jun. 16, 2025, 1 page. https://www.youtube.com/watch?v =_ rvCpYn-0eo?t=30.

Youtube: Taming Aquavrios! Riders of Icarus (Legendary Tame), ectronically retrieved Jun. 16, 2025, 1 page. https://www.youtube.com/watch?v=cX87vyeAdhc.

YouTube: Aquavrios Exclusive Summer 2017 Mount Tame (Riders of Icarus), electronically retrieved Jun. 16, 2025, 1 page. https://www.youtube.com/watch?v=h9avkJ6OH10.

YouTube: Riders of Icarus Wizard Guide 2020 Talents, Spell Rotations/Effects, Pets, Gear etc., electronically retrieved Jun. 16, 2025, 1 page. https://www.youtube.com/watch?v=M6_snwfy-Tc?t=1310.

YouTube: The Legend of Zelda: Breath of the Wild, electronically retrieved Jun. 16, 2025, 1 page. https://www.youtube.com/watch?v=T3KIWpULiX4.

http://archeage.game1wiki.com/index.php?%E4%B9%97%E3%82%8A%E7%89%A9%28%E3%82%B0%E3%83%A9%E3%82%A4%E3%83%80%E3%83%BC%29.

http://archeage.game1wiki.com/index.php?%EF%BC%85E5%9F%BA%E6%9C%AC%E6%93%8D%E4%BD%9C.

Guild Wars 2, "Announcing the Guild Wars 2 Launch Date" Jun. 28, 2012, 1 page. https://www.guildwars2.com/en/news/announcing-the-guild-wars-2-launch-date/.

Guild Wars 2 Official Wiki, "Mount", electronically retrieved Jul. 10, 2025, 1 page. https://web.archive.org/web/20200929051815/https://wiki.guildwars2.com/wiki/Mount.

Guild Wars 2 Official Wiki, "Graphical User Interface", electronically retrieved Jul. 10, 2025, 1 page. https://web.archive.org/web/20211027192049/https://wiki.guildwars2.com/wiki/Graphical_user_interface.

Youtube, "Ultimate Tips & Tricks Every Player Should Know—Guild Wars 2 Guide", electronically retrieved Jul. 10, 2025, 1 page. https://www.youtube.com/watch?v=nn50K5fTenl&t=201s.

Youtube, "The Freedom of Flying—Fly to the Hidden Garden Jumping Puzzle", electronically retrieved Jul. 10, 2025, 1 page. https://www.youtube.com/watch?v=bgNe_qKT_4Y.

Youtube, "Guild Wars 2 Ranger Pet Locations—Part 1—GW2 Base Game Pets", electronically retrieved Jul. 10, 2025, 1 page. https://www.youtube.com/watch?v=xfYHByRy19Y.

Guild Wars 2 Official Wiki, "Warclaw", electronically retrieved Jul. 10, 2025, 1 page. https://web.archive.org/web/20190416181451/https:/wiki.guildwars2.com/wiki/Warclaw.

Guild Wars 2 Official Wiki, "Griffon (Mount)", electronically retrieved Jul. 10, 2025, 1 page. https://web.archive.org/web/20180104012838/https:/wiki.guildwars2.com/wiki/Griffon_(mount)#Movement.2FControls.

Guild Wars 2 Official Wiki, "Soaring Rescue", electronically retrieved Jul. 10, 2025, 1 page. https://web.archive.org/web/20201101015830/https:/wiki.guildwars2.com/wiki/Soaring_Rescue.

Guild Wars 2 Official Wiki, "Character Creation", electronically retrieved Jul. 10, 2025, 1 page. https://web.archive.org/web/20181026031515/https:/wiki.guildwars2.com/wiki/Character_creation.

Guild Wars 2 Official Wiki, "Pet", electronically retrieved Jul. 10, 2025, 1 page. https://web.archive.org/web/20180218134828/https:/wiki.guildwars2.com/wiki/Pet.

Guild Wars 2 Official Wiki, "Damage", electronically retrieved Jul. 10, 2025, 1 page. https://web.archive.org/web/20140920202320/https://wiki.guildwars2.com/wiki/Damage.

(56) References Cited

OTHER PUBLICATIONS

Dragon Quest Monsters-Joker3, electronically retrieved Jul. 11, 2025, 1 page. http://www.dragonquest.jp/dqm-j3/.
"[Must Read] Announcement of Update Data Distribution for 'Dragon Quest Monsters Joker 3", Jun. 10, 2016, 1 page. http://www.dragonquest.jp/dqm-j3/popup/2016_0610.php.
Wiki, "DQMJ3/Dragon Quest Monsters Joker 3 Fastest Strategy Wiki", electronically retrieved Jul. 10, 2025, 1 page. https://web.archive.org/web/20200924181552/https://spwiki.net/dqmj3/wikis/37.html.
Youtube, "Climbing in ArcheAge", electronically retrieved Jul. 10, 2025, 1 page. https://www.youtube.com/watch?v=zZ99fl4mWaA.
Seesaawiki, "A Guide to ArcheAge!—Shortcuts", electronically retrieved Jul. 10, 2025, 1 page. https://seesaawiki.jp/aa-beginner/d/%a5%b7%a5%e7%a1%bc%a5%c8%a5%ab%a5%c3%a5%c8.
Seesaawiki, "A Guide to ArcheAge!—Target and Hate", electronically retrieved Jul. 10, 2025, 1 page. https://seesaawiki.jp/aa-beginner/d/%a5%bf%a1%bc%a5%b2%a5%c3%a5%c8%a4%c8%a5%d8%a5%a4%a5%c8.
Seesaawiki, "A Guide to ArcheAge!—Operating Environment", electronically retrieved Jul. 10, 2025, 1 page. https://seesaawiki.jp/aa-beginner/d/%C1%E0%BA%EE%B4%C4%B6%AD.
Wikigg Terraria, electronically retrieved Jul. 10, 2025, 1 page. https://terraria.wiki.gg/wiki/Desktop_version_histry/ja.
Wiki Terraria, "Bug", electronically retrieved Jul. 10, 2025, 1 page. https://web.archive.org/web/20200614205128/https://terraria.arcenserv.info/wiki/Bug_Net.
Wiki Terraria, "NPC", electronically retrieved Jul. 10, 2025, 1 page. https://web.archive.org/web/20200601135644/https://terraria.arcenserv.info/wiki/NPC.
Wiki Terraria, "Fall Damage", electronically retrieved Jul. 10, 2025, 1 page. https://web.archive.org/web/20200226074629/https://terraria.arcenserv.info/wiki/%E8%90%BD%E4%B8%8B%E3%83%80%E3%83%A1%E3%83%BC%E3%82%B8.
Seesaawiki, Craftopia/Craftopia Wiki, "Glider", electronically retrieved Jul. 10, 2025, 1 page. https://seesaawiki.jp/craftopia/d/%A5%B0%A5%E9%A5%A4%A5%C0%A1%BC.
Raison Detre, "[Craftopia] Keyboard and controller settings [Operation instructions]", Jun. 30, 2024, 1 page. https://volx.jp/craftopia-keyboard-controller-setting-spec.

* cited by examiner

FIG. 10
NORMAL STATE (BEFORE PLAYER CHARACTER BOARDS BIRD CHARACTER)
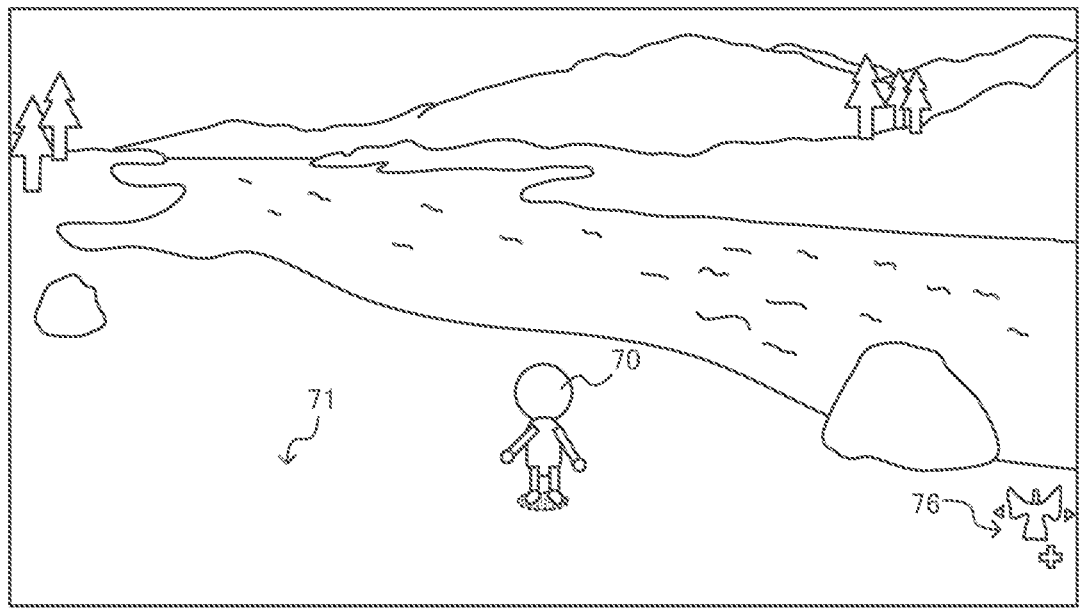
STATE WHERE PLAYER CHARACTER IS ABOARD BIRD CHARACTER
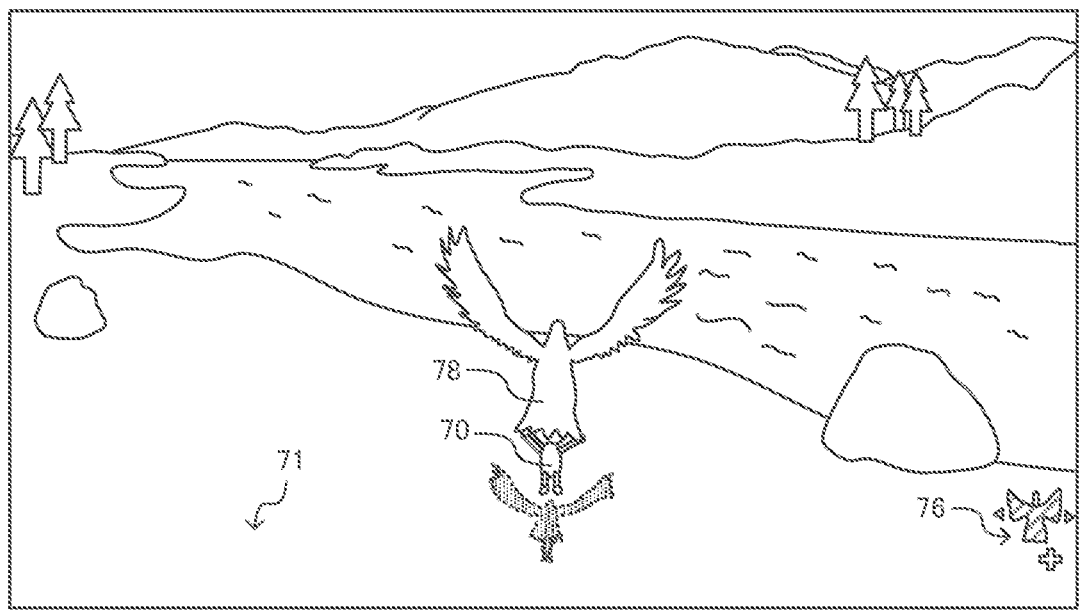

FIG. 11
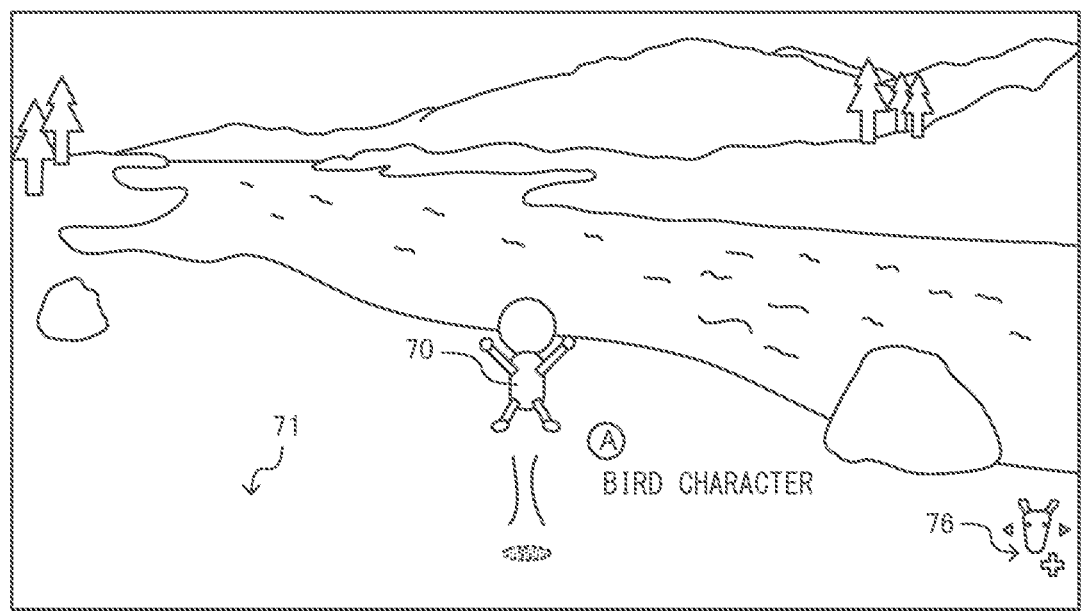
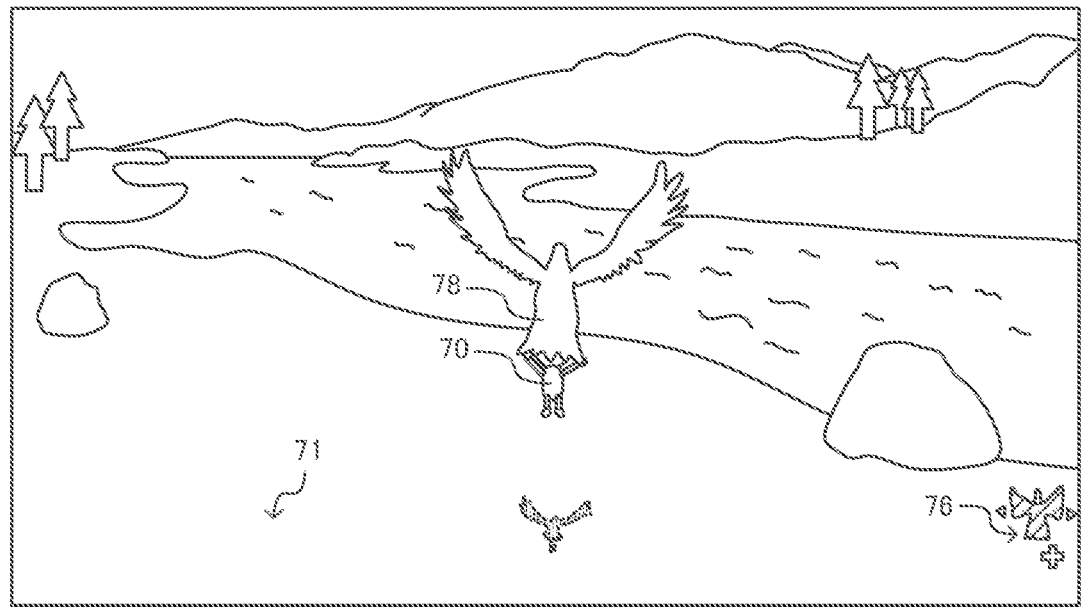

FIG. 12
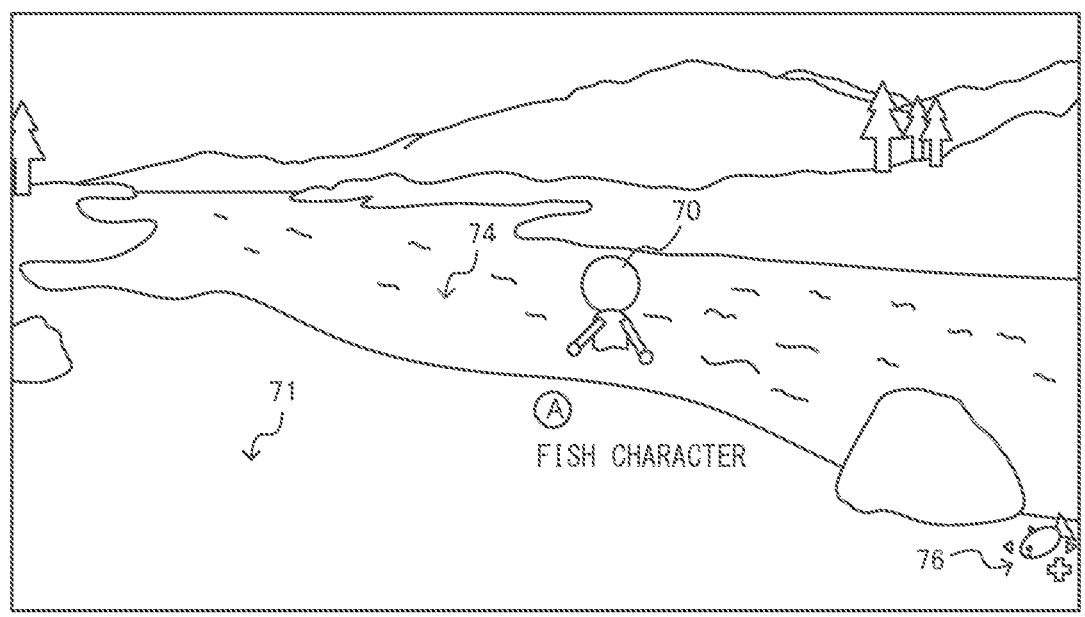
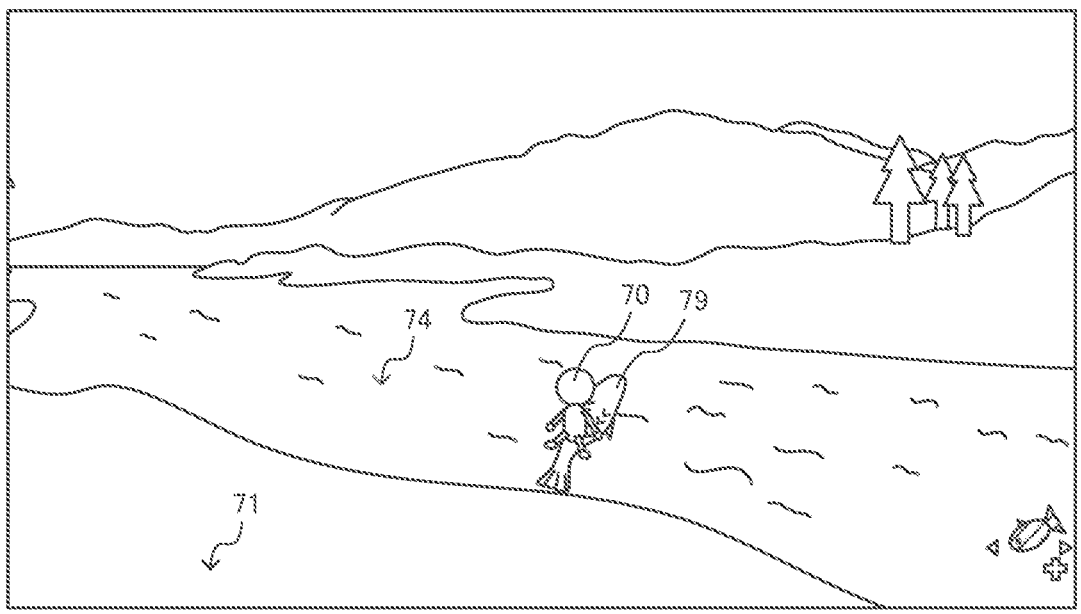

FIG. 13
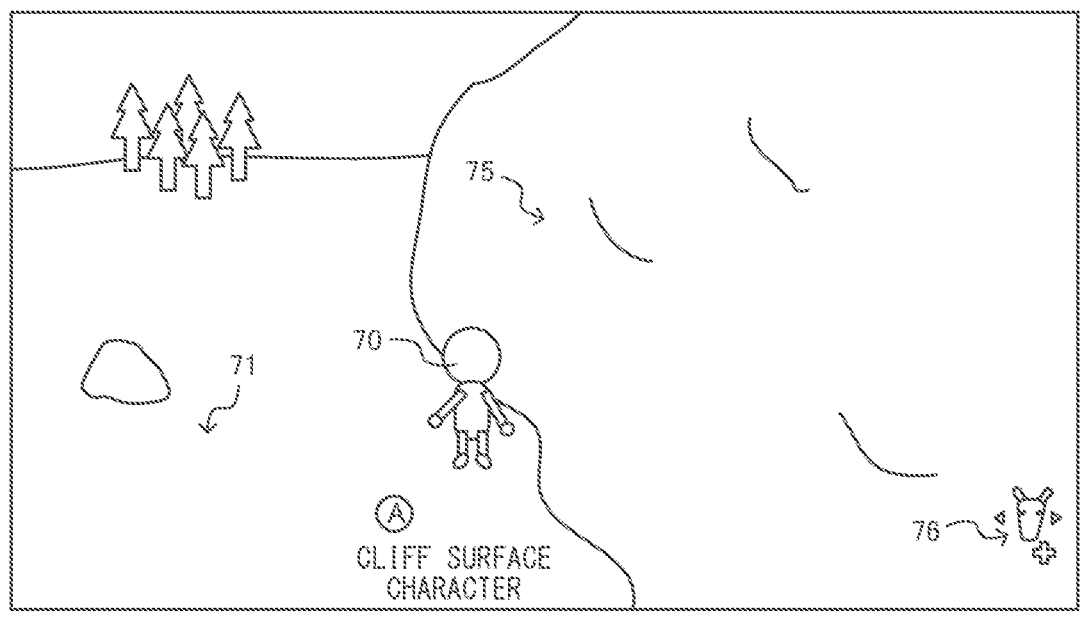
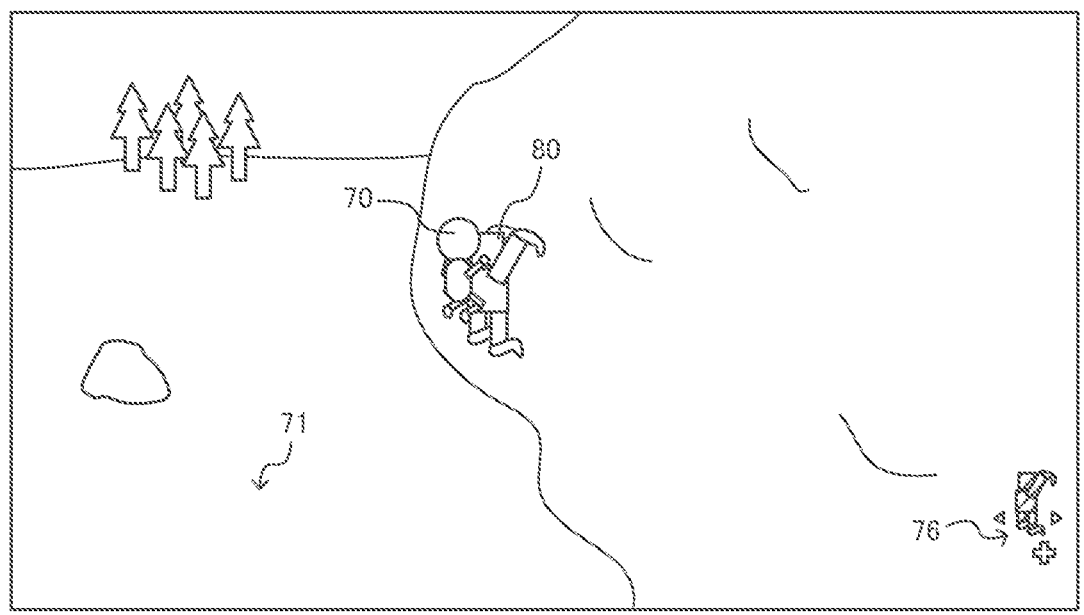

FIG. 14
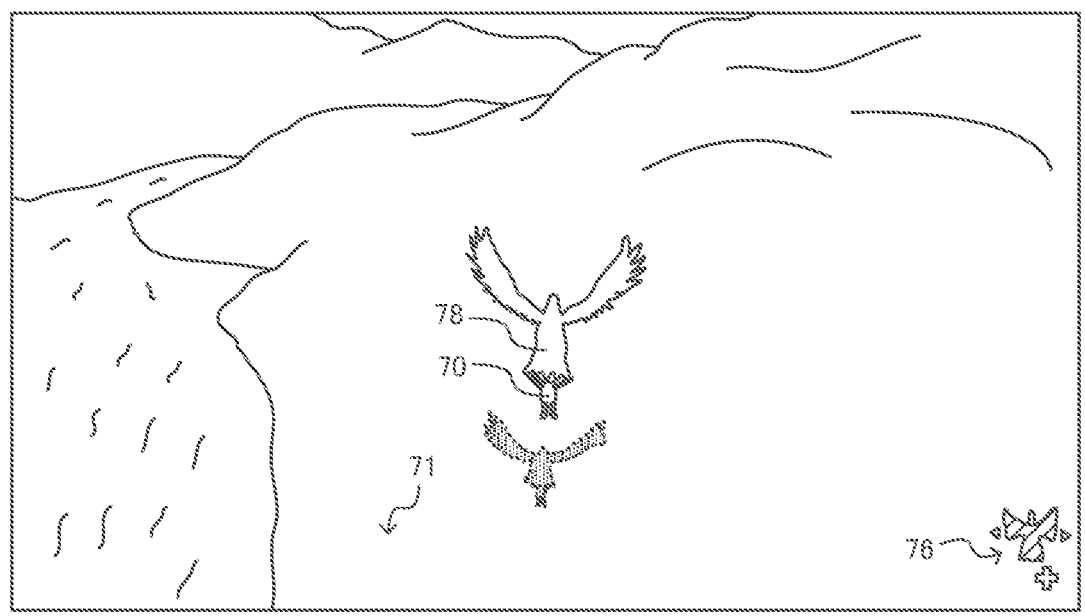
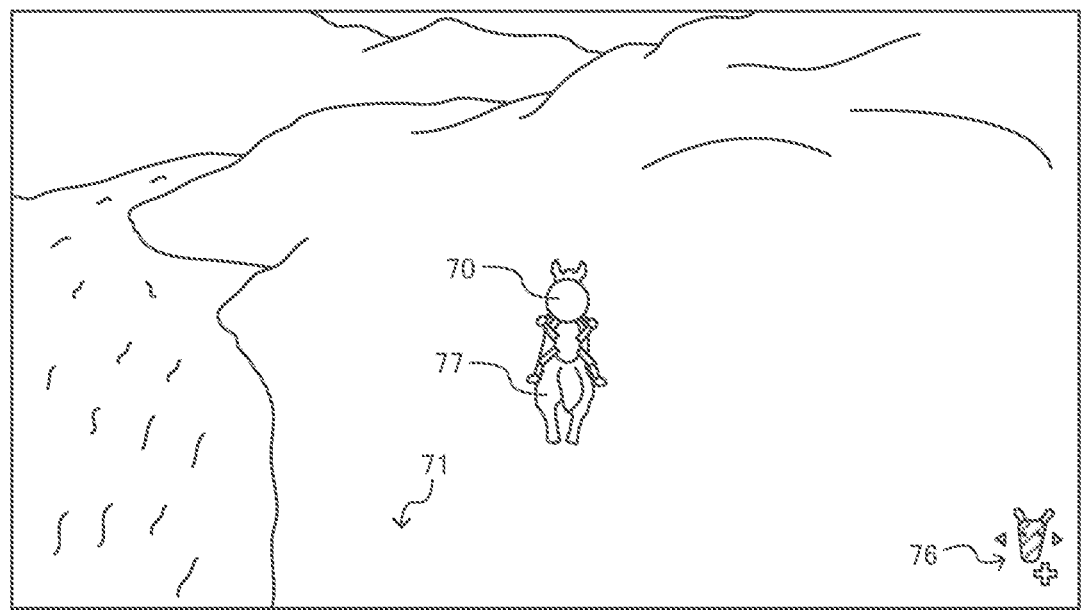

FIG. 15
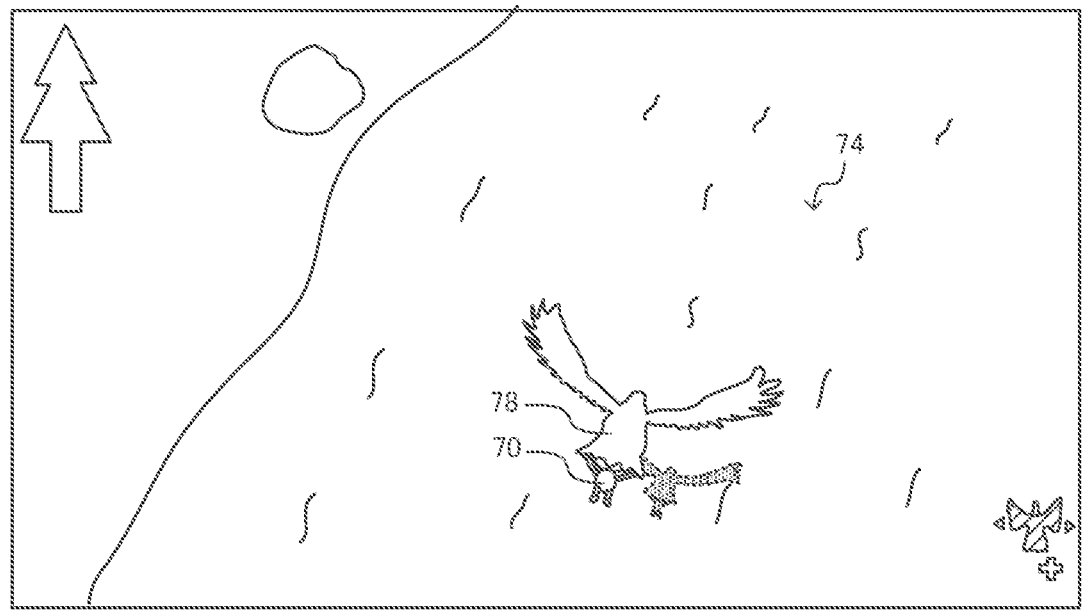
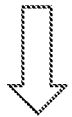
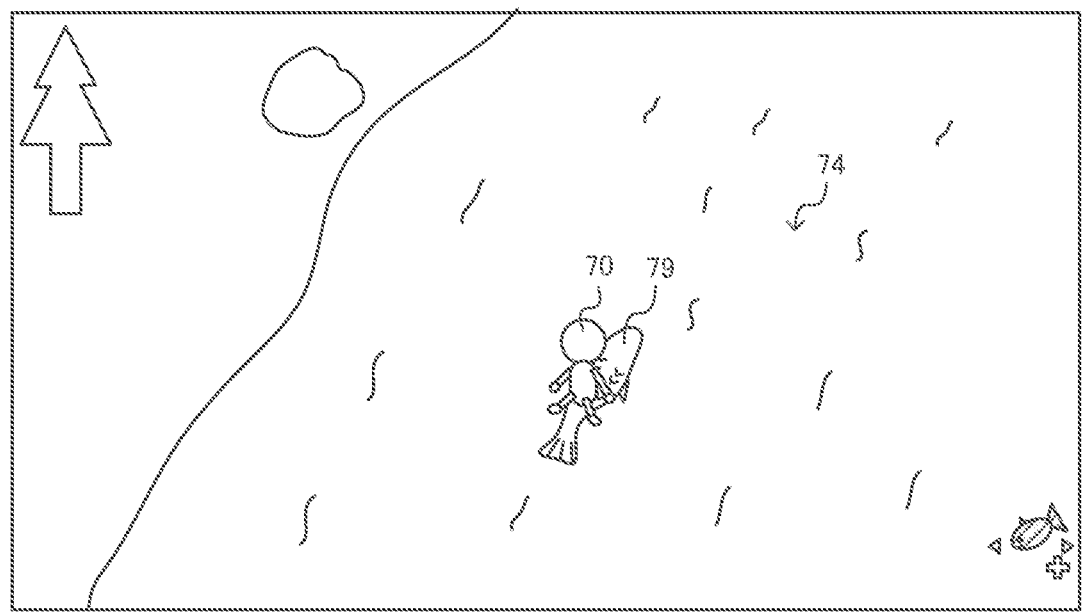

FIG. 16
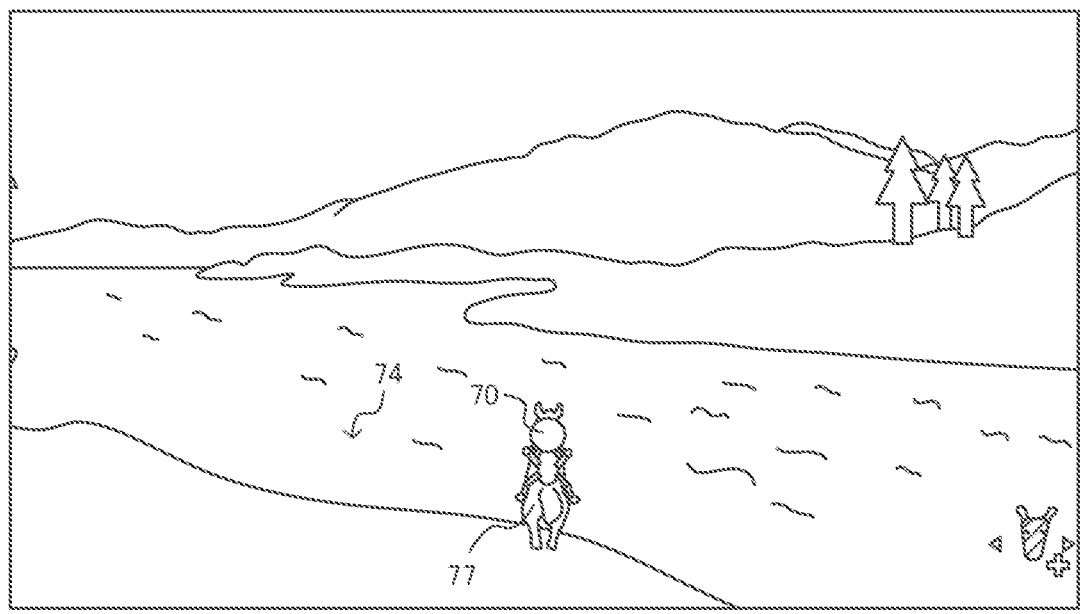
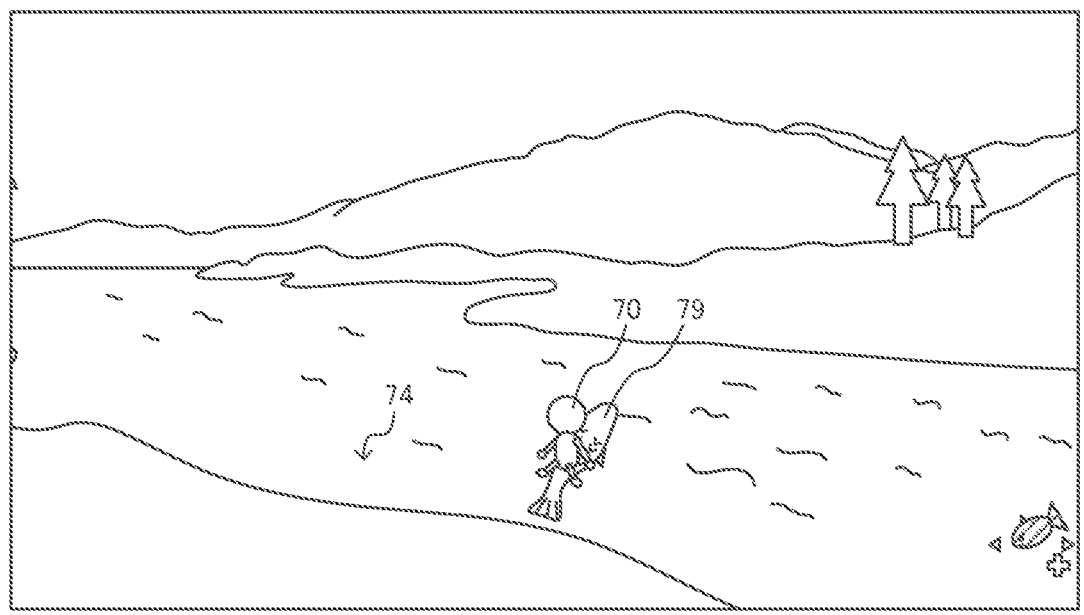

FIG. 17
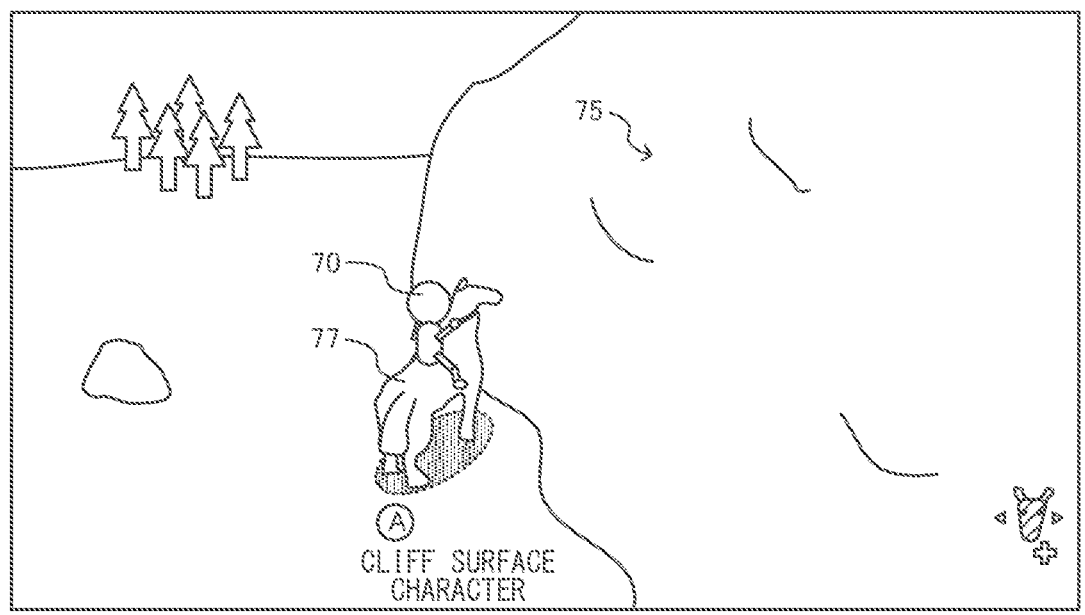
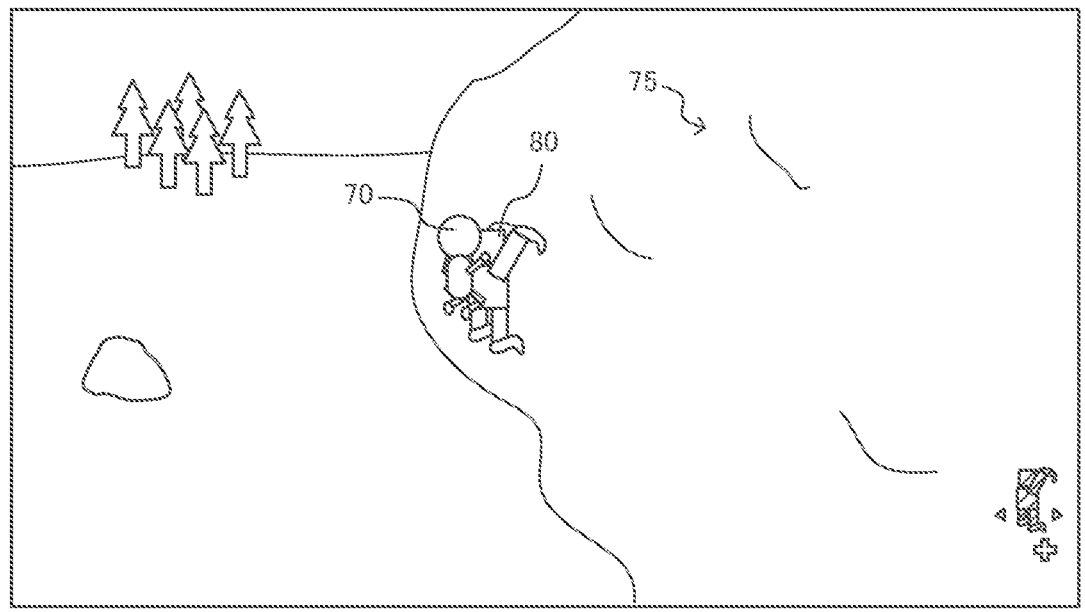

FIG. 18
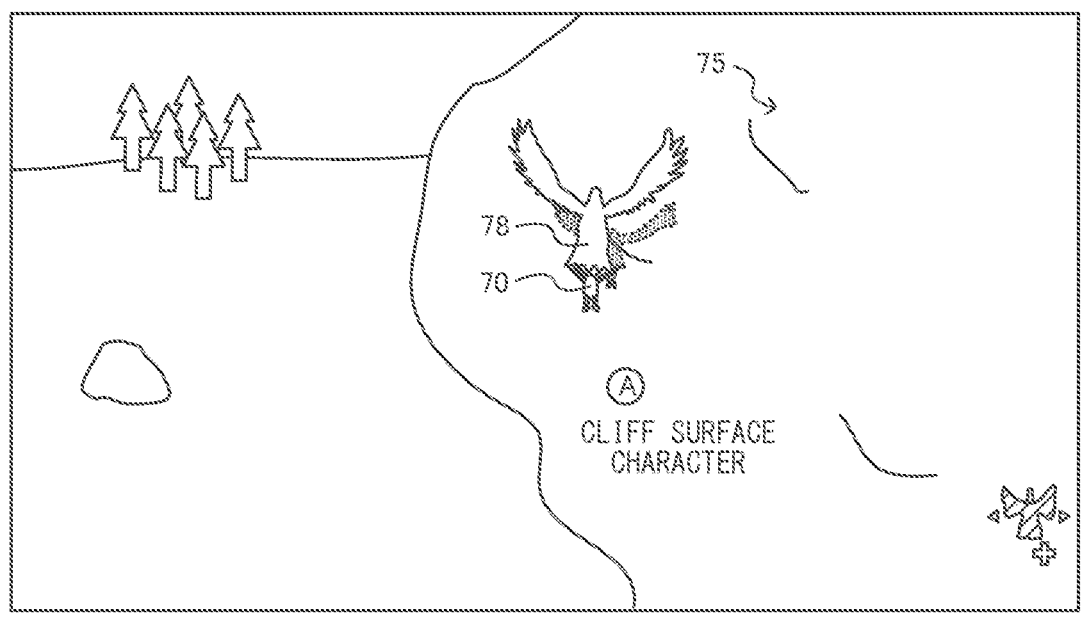
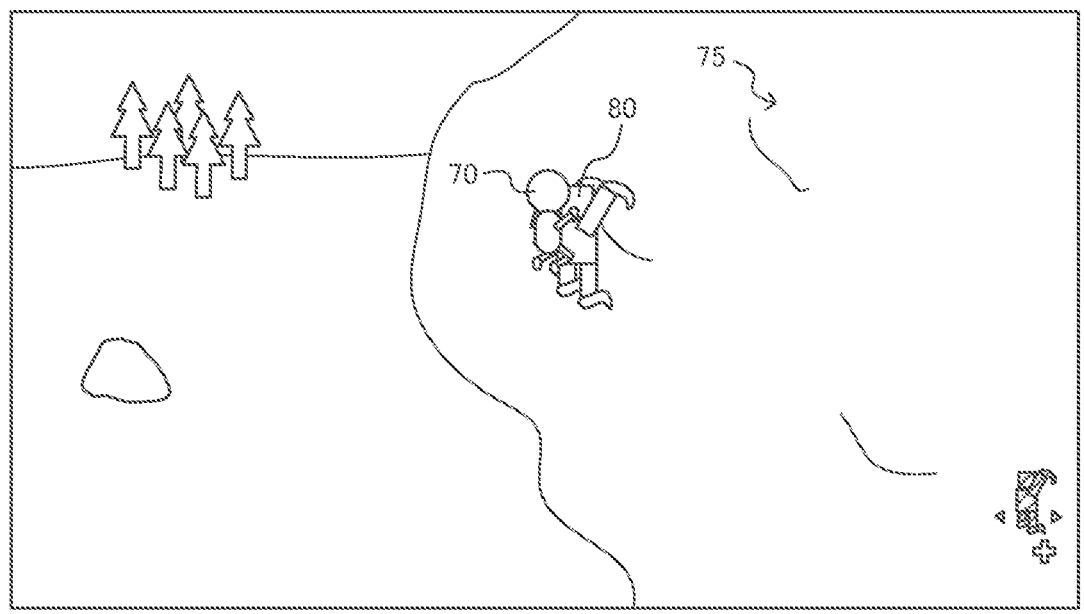

F I G. 2 3
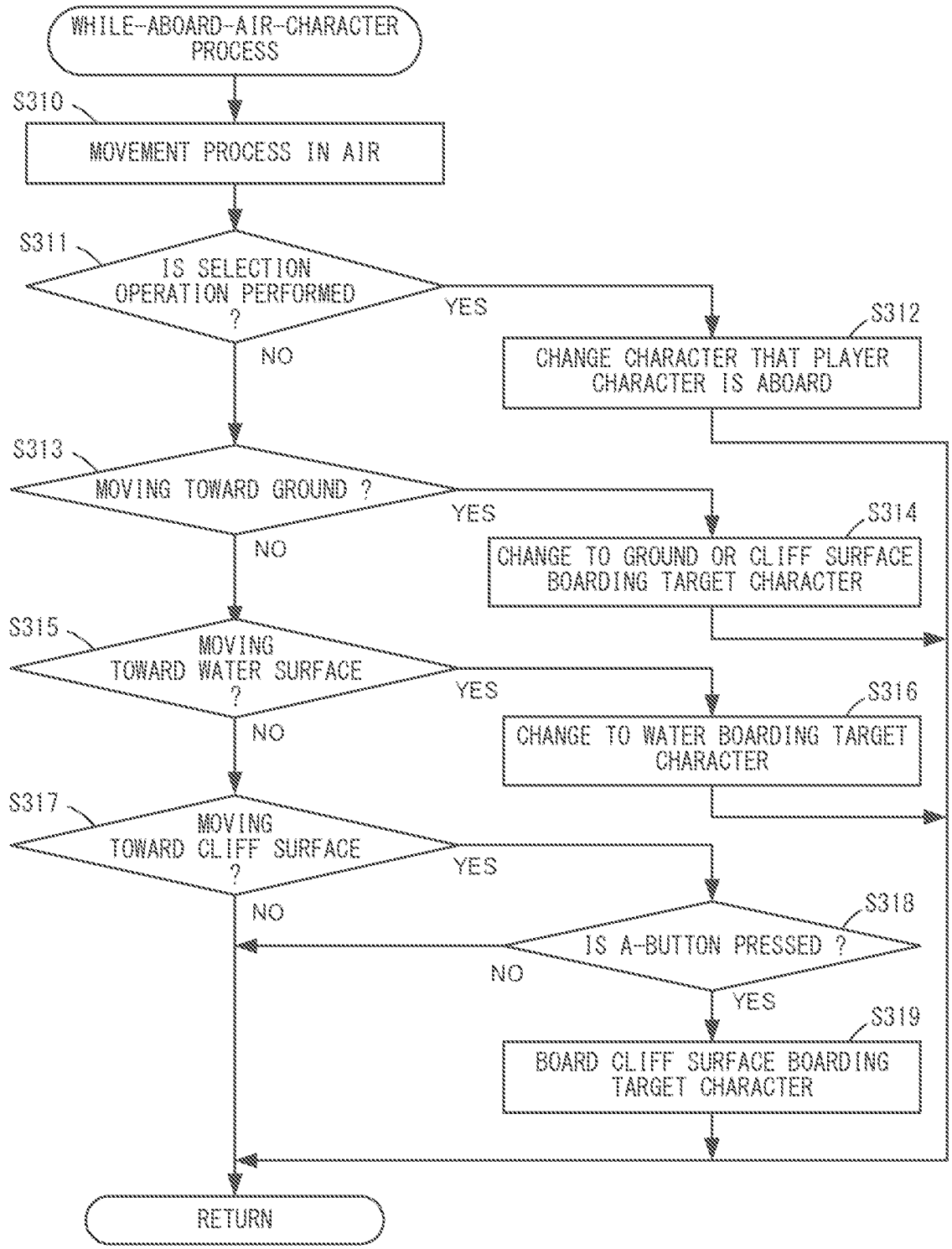

NON-TRANSITORY COMPUTER-READABLE STORAGE MEDIUM HAVING STORED THEREIN GAME PROGRAM, GAME SYSTEM, INFORMATION PROCESSING APPARATUS, AND INFORMATION PROCESSING METHOD

CROSS REFERENCE TO RELATED APPLICATION

This application is a continuation of U.S. patent application Ser. No. 17/949,831, filed on Sep. 21, 2022. This application also claims priority to Japanese Patent Application No. 2021-208276 filed on Dec. 22, 2021. The entire contents of all disclosures are incorporated herein by reference.

FIELD

An exemplary embodiment relates to a non-transitory computer-readable storage medium having stored therein a game program, a game system, an information processing apparatus, and an information processing method that are capable of moving a player character in a virtual space.

BACKGROUND AND SUMMARY

As a related art, there is a game where a player character can be caused to board an object and moved in a virtual space.

In the above game, there is room for improvement in switching objects to board.

Therefore, it is an object of an exemplary embodiment to provide a non-transitory computer-readable storage medium having stored therein a game program, a game system, an information processing apparatus, and an information processing method that are capable of, in a game where a player character is caused to board an object and moved, smoothly switching a plurality of boarding target objects.

To achieve the above object, the exemplary embodiment employs the following configurations.

A game program according to the exemplary embodiment causes a computer of an information processing apparatus to: control a player character in a virtual space based on an operation input; if, among a plurality of types of boarding target objects that the player character can board and include at least a ground boarding target object and an air boarding target object, the ground boarding target object is selected based on a selection operation and a boarding instruction is given, cause the player character to board the ground boarding target object and bring the player character into a state where the player character can move on a ground; if the air boarding target object is selected based on the selection operation and the boarding instruction is given, or if a first operation input is provided when the player character is in the air, cause the player character to board the air boarding target object and bring the player character into a state where the player character can move in the air; while the player character is aboard the air boarding target object, move the player character aboard the air boarding target object in the air based on an operation input; and if the player character aboard the air boarding target object moves toward the ground, automatically change to a state where the player character is aboard the ground boarding target object and bring the player character into a state where the player character can move on the ground.

Based on the above, it is possible to cause a player character to board a ground boarding target object or an air boarding target object and move the player character on the ground or in the air. It is possible to select a boarding target object and cause the player character to board the boarding target object, and in the air, it is also possible to immediately cause the player character to board the air boarding target object by providing a first operation input. When the player character moves from the air toward the ground, it is possible to automatically switch from the air boarding target object to the ground boarding target object. Thus, it is possible to smoothly switch boarding target objects.

Further, the boarding target objects may further include a water boarding target object capable of moving on or in water. The game program may cause the computer to, while the player character is aboard the air boarding target object, if the player character aboard the air boarding target object moves toward a water surface, automatically change to a state where the player character is aboard the water boarding target object and bring the player character into a state where the player character can move on or in water.

Based on the above, also on water, it is possible to cause the player character to board a water boarding target object and move the player character. When the player character moves from the air toward a water surface, it is possible to automatically switch from the air boarding target object to the water boarding target object. Thus, it is possible to smoothly switch boarding target objects.

Further, the game program may further cause the computer to, while the player character is aboard the ground boarding target object or the water boarding target object, if the air boarding target object is selected based on the selection operation, cause the player character to board the air boarding target object and bring the player character into a state where the player character can move in the air.

Based on the above, for example, while the player character is aboard the ground boarding target object, it is possible to switch to the air boarding target object by a selection operation without giving a boarding instruction.

Further, the game program may further cause the computer to: while the player character is aboard the ground boarding target object or the water boarding target object cause the player character to perform a jump action based on a second operation input; and if the first operation input is provided during the jump action, cause the player character to board the air boarding target object and bring the player character into a state where the player character can move in the air.

Based on the above, when the player character is in the air by a jump action, it is possible to cause the player character to board the air boarding target object in accordance with the first operation input.

Further, the game program may further cause the computer to, if the player character falls from a height exceeding a predetermined reference or from the air toward the ground at a speed exceeding a predetermined reference, cause predetermined damage to the player character.

Based on the above, if the player character falls to the ground, predetermined damage is caused to the player character. When the player character is in the air, it is possible to immediately cause the player character to board the air boarding target object by providing the first operation input. Thus, it is possible to prevent the player character from falling and being damaged.

Further, the boarding target objects may further include a cliff surface boarding target object capable of moving on a cliff surface. The game program may further cause the computer to: if the cliff surface boarding target object is selected based on the selection operation and the boarding instruction is given, cause the player character to board the cliff surface boarding target object and bring the player character into a state where the player character can move on the ground or the cliff surface; and while the player character is aboard the air boarding target object, if the player character aboard the air boarding target object moves toward the cliff surface, based on the first operation input, change to a state where the player character is aboard the cliff surface boarding target object and bring the player character into a state where the player character can move on the cliff surface.

Based on the above, while the player character is aboard the air boarding target object, and if the player character moves toward a cliff surface, it is possible to cause the player character to board a cliff surface boarding target object not automatically but in accordance with the first operation input. Consequently, it is possible to prevent switching unintended by a player and also relatively smoothly shift from the air boarding target object to the cliff surface boarding target object.

A game program according to another exemplary embodiment causes a computer of an information processing apparatus to: control a player character in a virtual space based on an operation input; if, among a plurality of types of boarding target objects that the player character can board and include at least a water boarding target object and an air boarding target object, the air boarding target object is selected based on a selection operation and a boarding instruction is given, or if a first operation input is provided when the player character is in the air, cause the player character to board the air boarding target object and bring the player character into a state where the player character can move in the air; if the boarding instruction is given when the water boarding target object is selected, cause the player character to board the water boarding target object and bring the player character into a state where the player character can move on or in water; while the player character is aboard the air boarding target object, move the player character aboard the air boarding target object in the air based on an operation input; and if the player character aboard the air boarding target object moves toward a water surface, automatically change to a state where the player character is aboard the water boarding target object and bring the player character into a state where the player character can move on or in water.

Based on the above, it is possible to cause a player character to board a water boarding target object or an air boarding target object and move the player character on water or in the air. It is possible to select a boarding target object and cause the player character to board the boarding target object, and in the air, it is also possible to immediately cause the player character to board the air boarding target object by providing a first operation input. When the player character moves from the air toward a water surface, it is possible to automatically switch from the air boarding target object to the water boarding target object. Thus, it is possible to smoothly switch boarding target objects.

A game program according to another exemplary embodiment causes a computer of an information processing apparatus to: control a player character based on in a virtual space an operation input; if, among a plurality of types of boarding target objects that the player character can board and include at least a ground boarding target object and a water boarding target object, the ground boarding target object is selected based on a selection operation and a boarding instruction is given, cause the player character to board the ground boarding target object and bring the player character into a state where the player character can move on a ground; while the player character is aboard the ground boarding target object, move the player character aboard the ground boarding target object on the ground based on an operation input; if the player character aboard the ground boarding target object moves toward a water surface, automatically change to a state where the player character is aboard the water boarding target object and bring the player character into a state where the player character can move on or in water; if the boarding instruction is given when the water boarding target object is selected, or if a first operation input is provided when the player character is on or in water, cause the player character to board the water boarding target object and bring the player character into a state where the player character can move on or in water; while the player character is aboard the water boarding target object, move the player character aboard the water boarding target object on or in water based on an operation input; and if the player character aboard the water boarding target object moves toward the ground, automatically change to a state where the player character is aboard the ground boarding target object and bring the player character into a state where the player character can move on the ground.

Based on the above, it is possible to cause a player character to board a ground boarding target object or a water boarding target object and move the player character on the ground or on water. It is possible to select a boarding target object and cause the player character to board the boarding target object, and on water, it is also possible to immediately cause the player character to board the water boarding target object by providing a first operation input. When the player character moves from the ground toward a water surface, it is possible to automatically switch from the ground boarding target object to the water boarding target object. When the player character moves from the water surface toward the ground, it is possible to automatically switch from the water boarding target object to the ground boarding target object. Thus, it is possible to smoothly switch boarding target objects.

Further, the game program may further cause the computer to, if the player character stays on or in water for a time exceeding a predetermined reference, cause predetermined damage to the player character.

Based on the above, when the player character is in water, predetermined damage is caused to the player character. When the player character is in water, it is possible to immediately cause the player character to board the water boarding target object by providing the first operation input. Thus, it is possible to prevent the player character from being damaged.

Further, the boarding target objects may further include a cliff surface boarding target object capable of moving on a cliff surface. The game program may further cause the computer to: if the cliff surface boarding target object is selected based on the selection operation and the boarding instruction is given, cause the player character to board the cliff surface boarding target object and bring the player character into a state where the player character can move on the ground or the cliff surface; and while the player character is aboard the water boarding target object, if the player character aboard the water boarding target object moves toward the cliff surface, based on the first operation input, change to a state where the player character is aboard the cliff surface boarding target object and bring the player character into a state where the player character can move on the cliff surface.

Based on the above, while the player character is aboard a water boarding target object, if the player character moves toward a cliff surface, it is possible to cause the player character to board a cliff surface boarding target object not automatically but in accordance with the first operation input. Consequently, it is possible to prevent switching unintended by a player, and it is also possible to relatively smoothly shift from a water boarding target object to a cliff surface boarding target object.

Another exemplary embodiment may be an information processing apparatus that executes the above program, or may be an information processing system. Another exemplary embodiment may be an information processing method executed by a processor.

According to the exemplary embodiment, it is possible to cause a player character to board a boarding target object and move in a virtual space. It is possible to smoothly switch boarding target objects.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 10 is an example non-limiting diagram showing an example of the scene where the player character 70 boards a bird character 78 when being on the ground;

FIG. 11 is an example non-limiting diagram showing an example of the scene where the player character 70 jumps on the ground and boards the bird character 78;

FIG. 12 is an example non-limiting diagram showing an example of the scene where the player character 70 boards a fish character 79 when being in water;

FIG. 13 is an example non-limiting diagram showing an example of the scene where the player character 70 boards a cliff surface boarding target character 80 when being near a cliff surface 75;

FIG. 14 is an example non-limiting diagram showing an example of the scene where the state where the player character 70 is aboard an air boarding target character switches to the state where the player character 70 is aboard a ground boarding target character;

FIG. 15 is an example non-limiting diagram showing an example of the scene where the state where the player character 70 is aboard the air boarding target character switches to the state where the player character 70 is aboard a water boarding target character;

FIG. 16 is an example non-limiting diagram showing an example of the scene where the state where the player character 70 is aboard the ground boarding target character switches to the state where the player character 70 is aboard the water boarding target character;

FIG. 17 is an example non-limiting diagram showing an example of the scene where the state where the player character 70 is aboard the ground boarding target character switches to the state where the player character 70 is aboard the cliff surface boarding target character;

FIG. 18 is an example non-limiting diagram showing an example of the scene where the state where the player character 70 is aboard the air boarding target character switches to the state where the player character 70 is aboard the cliff surface boarding target character;

FIG. 23 is an example non-limiting flow chart showing an example of a while-aboard-air-character process in step S301;

DETAILED DESCRIPTION OF NON-LIMITING EXAMPLE EMBODIMENTS

System Configuration

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
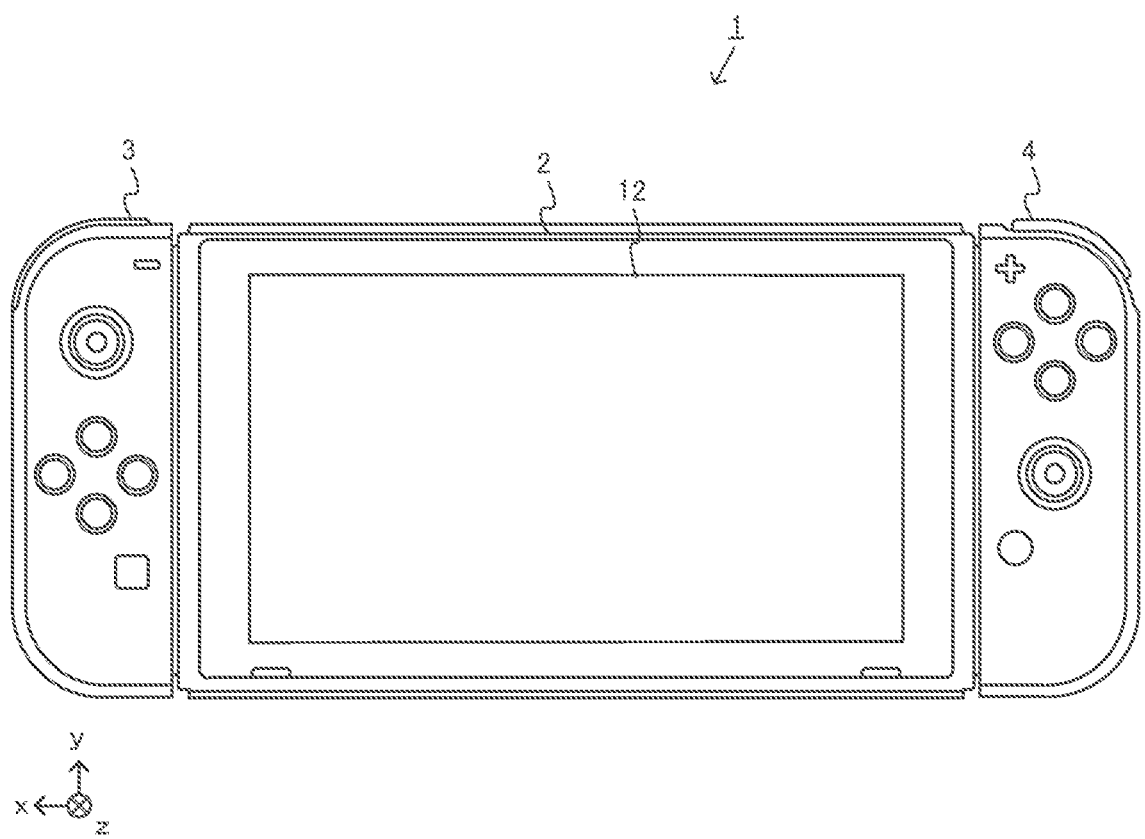
FIG. 1 is an illustrative non-limiting diagram showing the state where a left controller 3 and a right controller 4 are attached to a main body apparatus 2.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
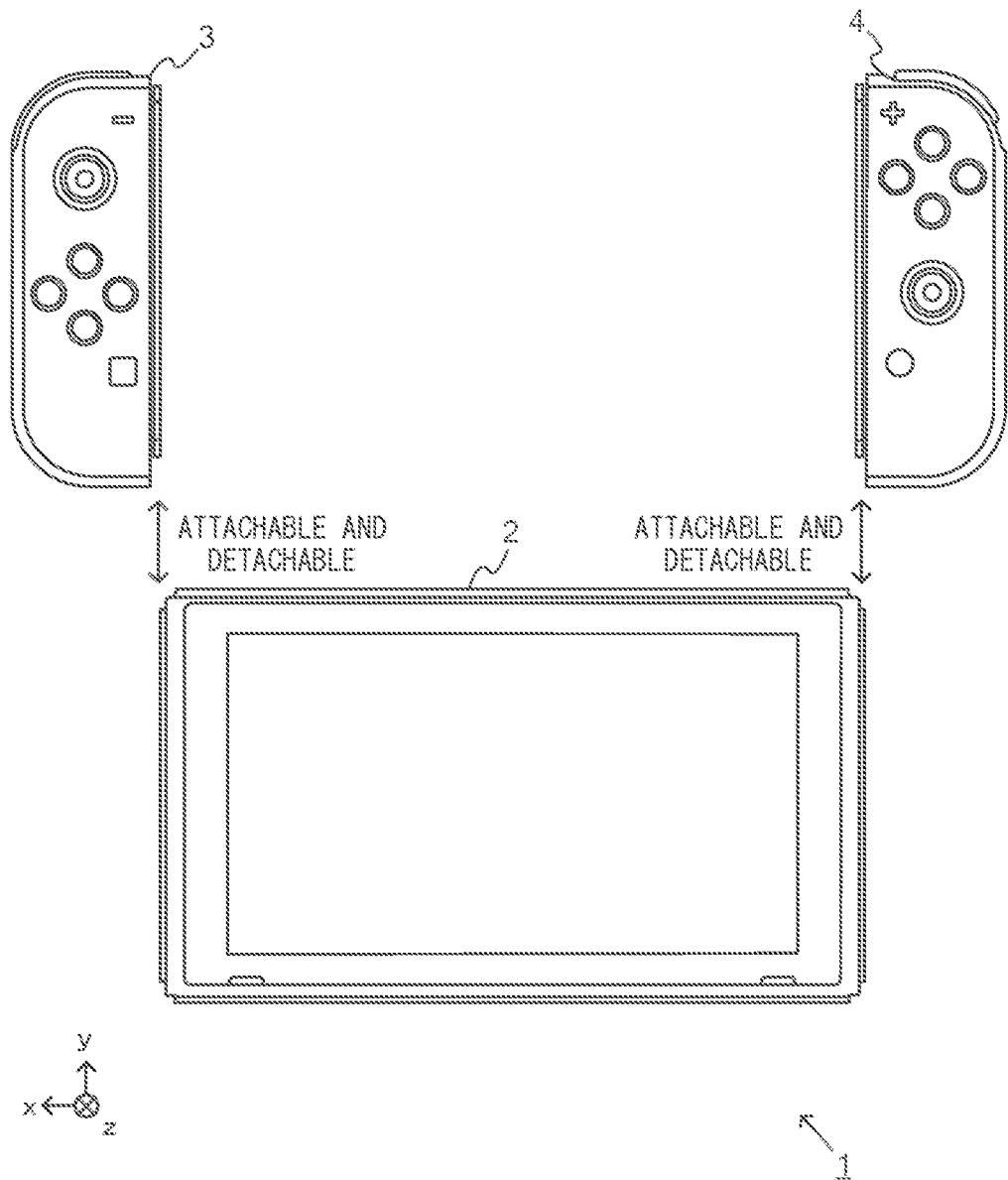
FIG. 2 is an illustrative non-limiting diagram showing an example of the state where each of the left controller 3 and the right controller 4 is detached from the main body apparatus 2.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
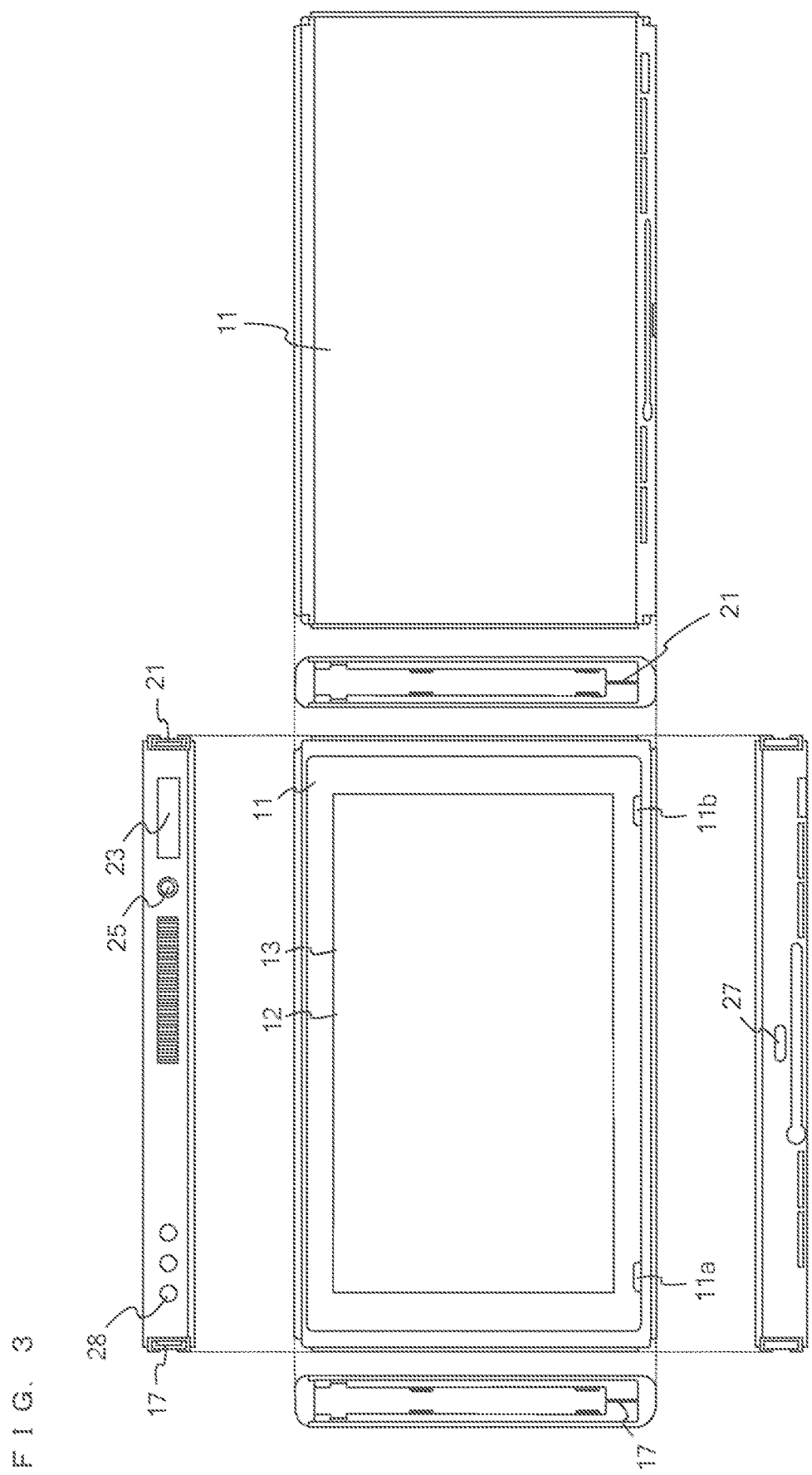
FIG. 3 is illustrative non-limiting six orthogonal views showing an example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
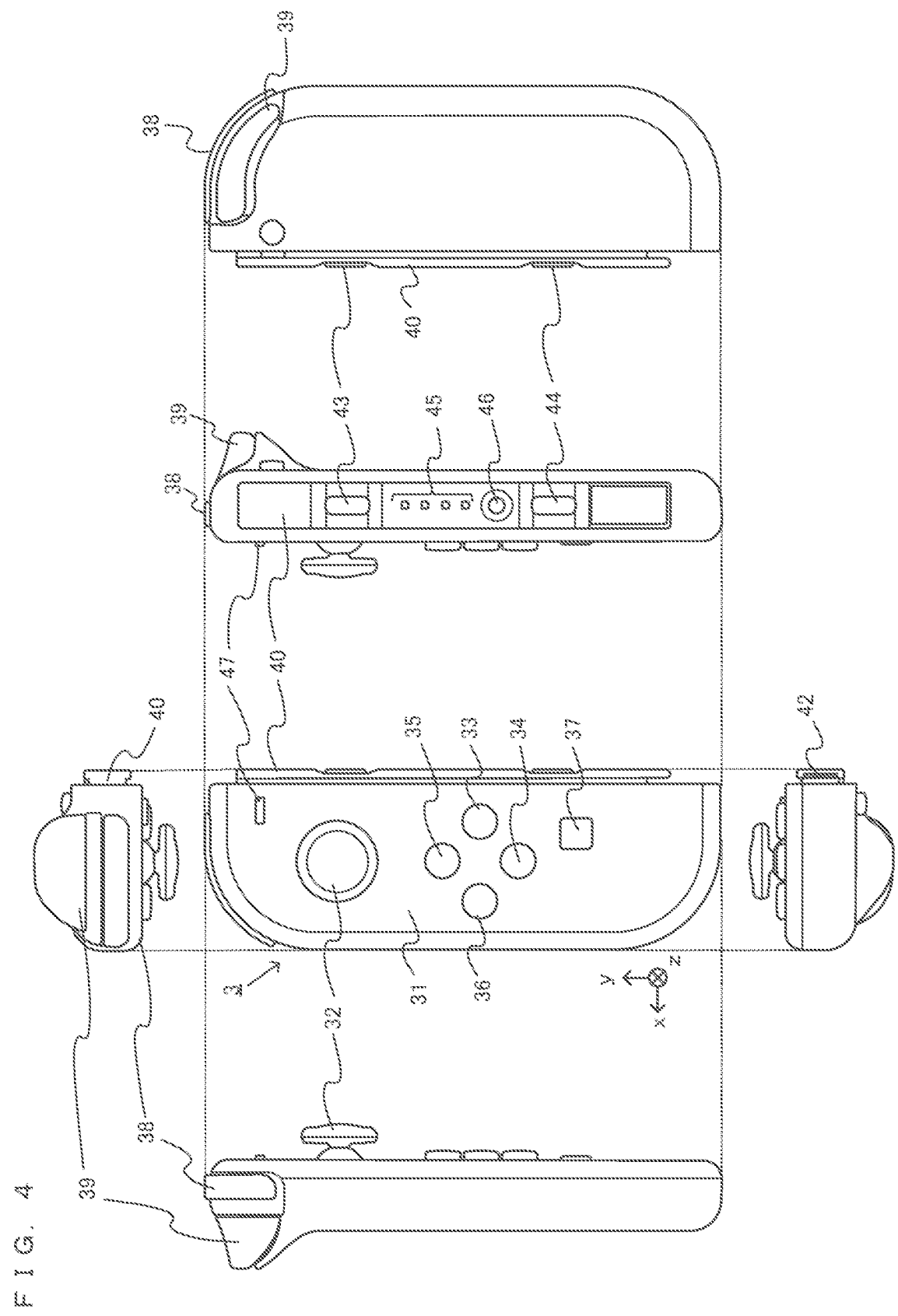
FIG. 4 is illustrative non-limiting six orthogonal views showing an example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
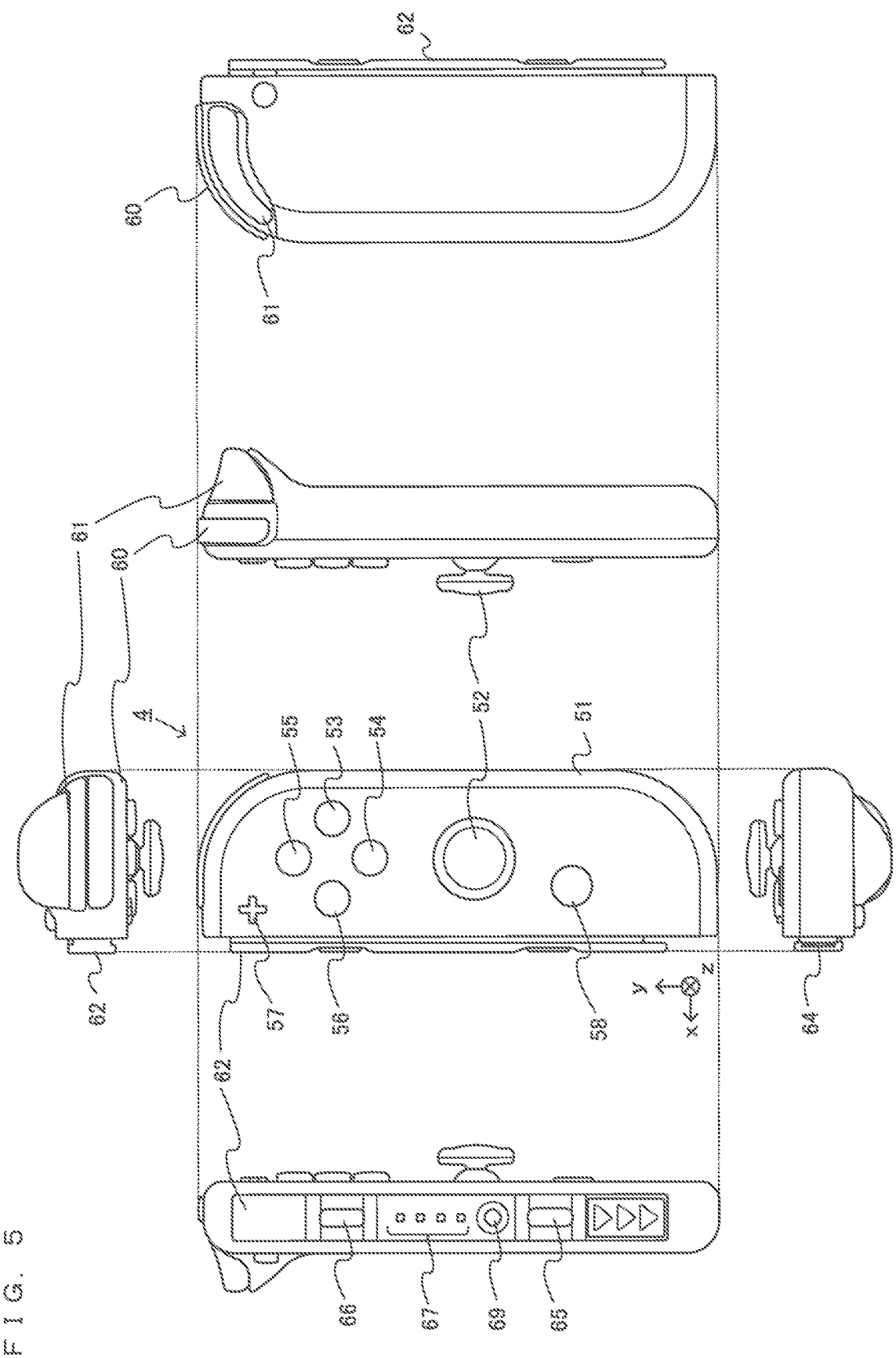
FIG. 5 is illustrative non-limiting six orthogonal views showing an example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
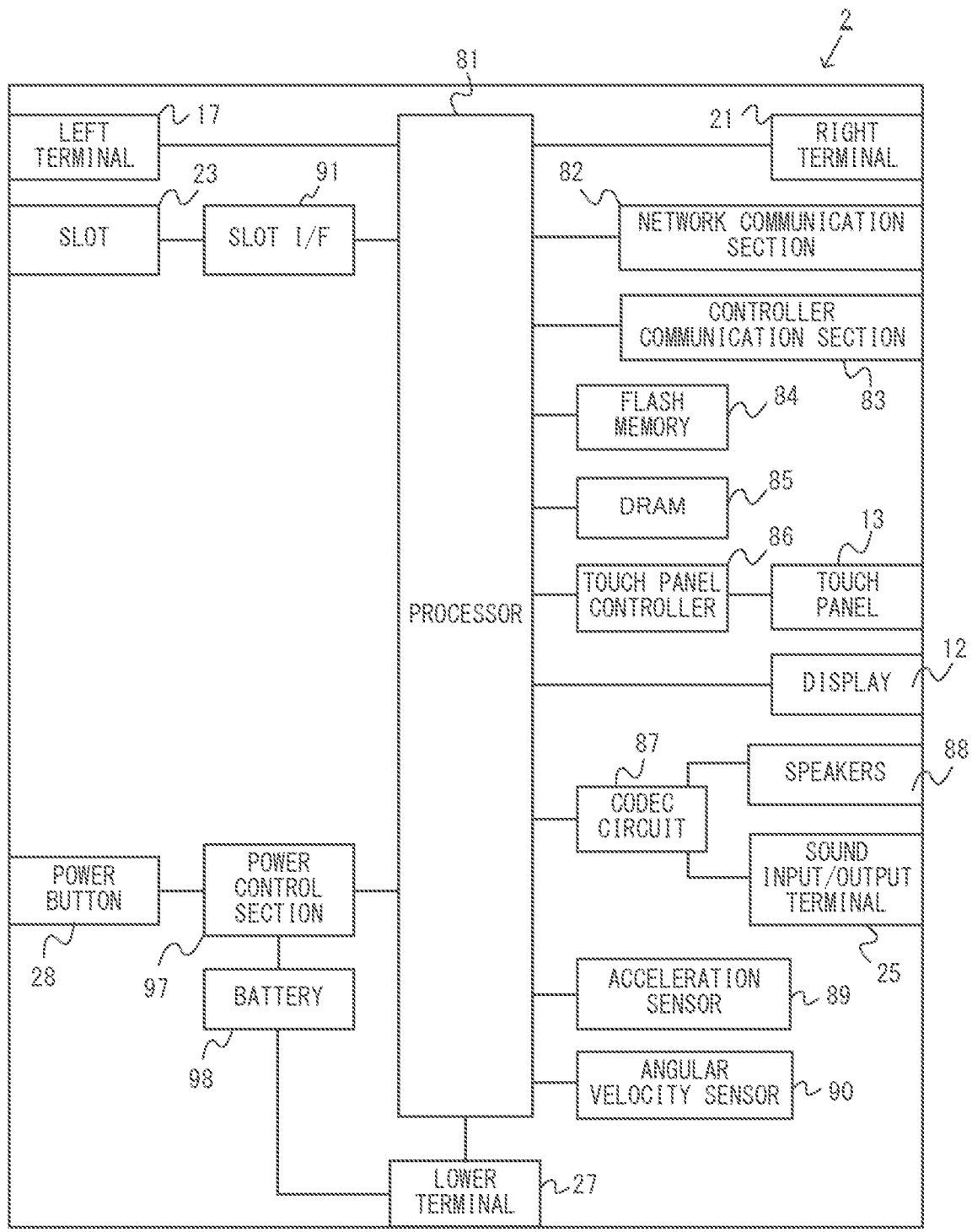
FIG. 6 is an illustrative non-limiting block diagram showing an example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
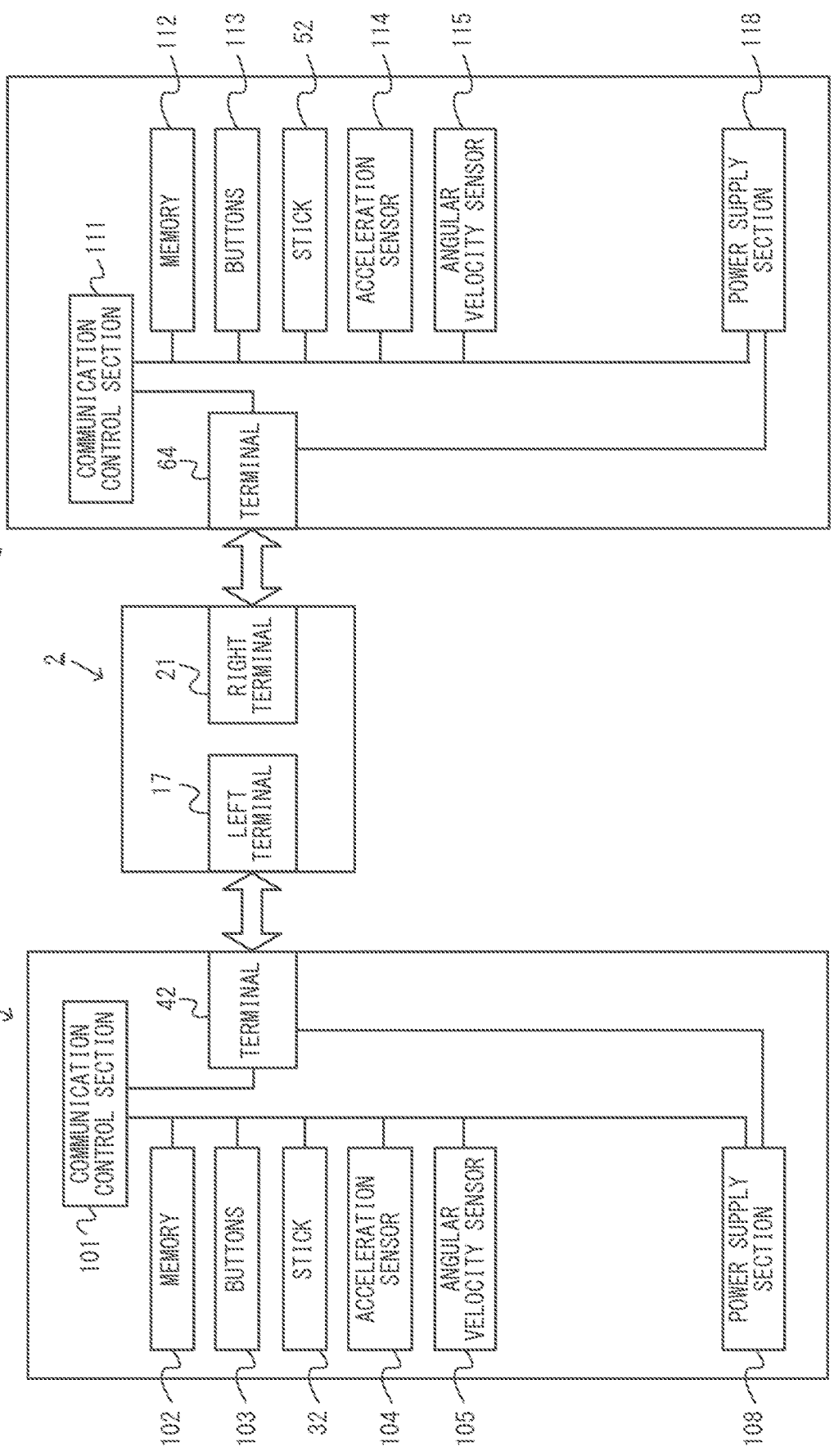
FIG. 7 is an illustrative non-limiting block diagram showing an example of the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

Overview of Game According to Exemplary Embodiment

Figure 8:
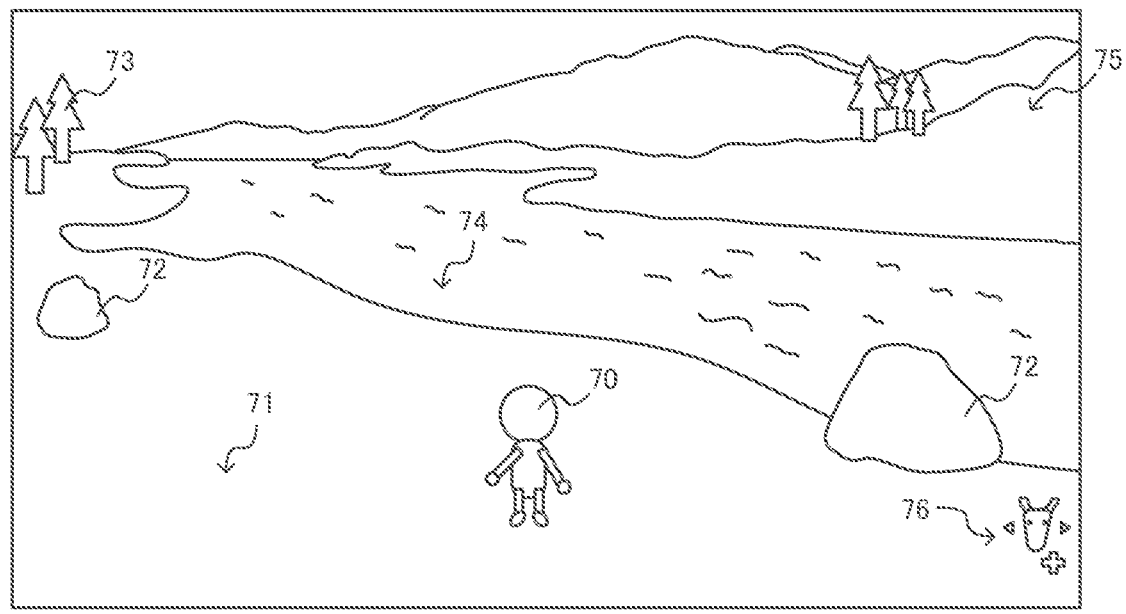
FIG. 8 is an example non-limiting diagram showing an example of a game image displayed during the execution of a game according to the exemplary embodiment.

Next, an overview of a game according to the exemplary embodiment is described. FIG. 8 is a diagram showing an example of a game image displayed during the execution of the game according to the exemplary embodiment.

As shown in FIG. 8, in a virtual space, a ground 71 is formed. On the ground 71, a player character 70 is placed. The ground 71 is a surface perpendicular to an axis in the up-down direction in the virtual space and is an area where the player character 70 can move. The ground 71 does not need to be a perfectly horizontal surface, and may have unevenness. A part or the entirety of the ground 71 may have a predetermined angle (e.g., less than 30 degrees) to the axis in the up-down direction in the virtual space. The ground 71 may be of a plurality of types such as soil, sand, and grassland. On the ground 71, a rock object 72, a tree object 73, and the like are placed in addition to the player character 70.

In the virtual space, a water surface 74 is also formed. The water surface 74 is at a position lower than the ground 71 and is a surface almost parallel to the ground. The water surface 74 may be, for example, a river, a lake, a sea, or the like. The water surface 74 is an area where it is difficult or impossible for the player character 70 to move in a normal state. If the player character 70 enters the area of the water surface 74 in the normal state, the player character 70 can swim for a predetermined period, but then sinks into water and receives damage. As will be described below, the player character 70 can move in the area of the water surface 74 (on or in water) in the state where the player character 70 is aboard a water boarding target character.

In the virtual space, a cliff surface 75 is also present. The cliff surface 75 is a surface having a predetermined angle (e.g., greater than or equal to 30 degrees) to the ground 71 and is a surface where it is difficult or impossible for the player character 70 to move in the normal state. As will be described below, the player character 70 can move up and down the cliff surface 75 in the state where the player character 70 is aboard a cliff surface boarding target character.

The player character 70 moves in the virtual space in accordance with an operation input provided by a player. For example, in accordance with an input to the analog stick 32 of the left controller 3, the player character 70 moves on the ground 71.

In the game according to the exemplary embodiment, the player character 70 can battle against an enemy character or catch the enemy character while moving in the virtual space. The caught enemy character becomes an owned character owned by the player. After that, the player can advance the game using the owned character. For example, if the player character 70 encounters another enemy character, the player can cause the owned character to battle against the encountered enemy character. If a predetermined condition is satisfied in the battle, the encountered enemy character is further added to owned characters of the player. In this manner, the player can acquire a plurality of types of owned characters as their possessions during the game.

A plurality of owned characters include an owned character that the player character 70 can board (ride). The owned character that the player character 70 can board is referred to as a "boarding target character". Here, "the player character 70 boards the boarding target character" means that the player character 70 is in the state where the player character 70 can move integrally with the boarding target character. For example, "the player character 70 boards the boarding target character" includes the state where the player character 70 rides on the boarding target character, the state where the player character 70 holds on to the boarding target character, and the state where the player character 70 dangles from the boarding target character. "The player character 70 boards the boarding target character" also includes a case where the player character 70 and the boarding target character can integrally move not only in direct contact but also in indirect contact with each other.

The boarding target character is of a plurality of types. For example, the plurality of types of boarding target characters include a ground boarding target character, a water boarding target character, an air boarding target character, and a cliff surface boarding target character.

The ground boarding target character is a boarding target character capable of moving on the ground 71 and is a character suitable for moving on the ground 71. It is impossible or difficult for the ground boarding target character to move in an area other than the ground (on or in water, in the air, or on the cliff surface).

The water boarding target character is a boarding target character capable of moving on or in water (in the area of the water surface 74). It is impossible or difficult for the water boarding target character to move in an area other than on or in water (on the ground, in the air, or on the cliff surface).

The air boarding target character is a boarding target character capable of moving in the air. It is impossible or difficult for the air boarding target character to move in an area other than in the air (on the ground, on or in water, or on the cliff surface). The player character 70 is subjected to gravity acting downward in the virtual space in the state where the player character 70 is not aboard the air boarding target character (the normal state or the state where the player character 70 is aboard a boarding target character other than the air boarding target character). Thus, the player character 70 cannot continue to be present in the air and falls in the air. If the player character 70 falls from a position at a predetermined height or more to the ground 71 or falls to the ground 71 at a predetermined speed or more, the player character 70 receives predetermined damage when the player character 70 falls to the ground 71.

The cliff surface boarding target character is a character suitable for moving on the cliff surface 75 and is a boarding target character capable of moving up and down the cliff surface 75. The cliff surface boarding target character can move on the cliff surface 75 or the ground 71. It is impossible or difficult for the cliff surface boarding target character to move in an area other than the cliff surface 75 or the ground 71 (on or in water or in the air).

The player can cause the player character 70 to board a boarding target character and move the player character 70 and the boarding target character in the virtual space. As shown in FIG. 8, at the lower right of the game image, a selection image 76 for selecting any of the plurality of types of boarding target characters is displayed.

The selection image 76 is an image representing a currently selected boarding target character. In FIG. 8, as the selection image 76, an image representing a horse character 77 as an example of the ground boarding target character is displayed. For example, if the button 33 or 36 of the left controller 3 is pressed, the selection image 76 switches. For example, the player can select any of the plurality of boarding target characters using the button 33 or 36. For example, if the player character 70 is on the ground 71, the player character 70 can board any of a plurality of ground boarding target characters including the horse character 77 (see FIG. 9). The player can select any of the plurality of ground boarding target characters by a selection operation using the button 33 or 36. If the player character 70 is on the ground 71, the player can also select a bird character 78 (described below), which is an example of the air boarding target character.

As shown in FIG. 8, in the state where the horse character 77 is selected, for example, if the plus button 57 of the right controller 4 is pressed, the player character 70 boards the horse character 77.

Figure 9:
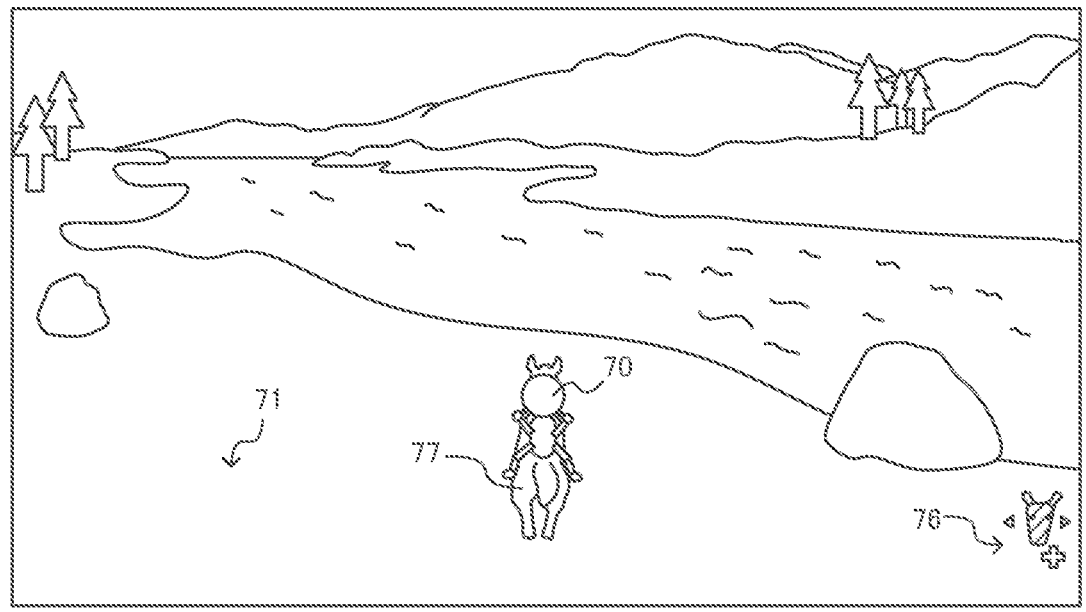
FIG. 9 is an example non-limiting diagram showing an example of a game image of the state where a player character 70 is aboard a horse character 77.

FIG. 9 is a diagram showing an example of a game image of the state where the player character 70 is aboard the horse character 77. As shown in FIG. 9, in the state where the horse character 77 is selected, if a boarding instruction is given (e.g., the plus button 57 is pressed), the horse character 77 appears, and the player character 70 enters the state where the player character 70 is aboard the horse character 77. Consequently, the player character 70 and the horse character 77 enter the state where the player character 70 and the horse character 77 can integrally move on the ground 71. In accordance with an operation input provided by the player, the player character 70 moves on the ground 71 in the state where the player character 70 is aboard the horse character 77. In the state where the player character 70 is aboard the horse character 77, the player character 70 can move on the ground 71 faster than in the normal state. If the player character 70 is aboard the horse character 77, the display form of the selection image 76 representing the horse character 77 changes.

FIG. 10 is a diagram showing an example of the scene where the player character 70 boards a bird character 78 when being on the ground.

In the state where the player character 70 is in the normal state, any of the plurality of boarding target characters is selected by the selection operation using the button 33 or 36. Specifically, if the button 33 or 36 is pressed, the selection image 76 at the lower right of the screen switches. Every time the button 33 or 36 is pressed, a currently selected boarding target character switches, and an image representing the currently selected boarding target character is displayed as the selection image 76.

As shown in the upper diagram of FIG. 10, when an image representing the bird character 78 is displayed as the selection image 76, if a boarding instruction is given (e.g., the plus button 57 is pressed), the bird character 78 appears, and the player character 70 enters the state where the player character 70 is aboard the bird character 78. In the lower diagram of FIG. 10, the player character 70 dangles from the bird character 78, the player character 70 and the bird character 78 float in the air, and the shadow of the bird character 78 is projected onto the ground 71. If the player character 70 is aboard the bird character 78, the display form of the selection image 76 representing the bird character 78 changes.

In the state where the player character 70 is aboard the bird character 78, the player character 70 can move in the air in accordance with an operation input (e.g., an input to the analog stick 32). Thus, the player character 70 can move in the virtual space without being influenced by terrains (the ground 71, the water surface 74, and the like). In the state where the player character 70 is aboard the bird character 78, the player character 70 can move in the virtual space faster than in the normal state.

Even when the player character 70 is in the air aboard the bird character 78, the player can select a boarding target character by the selection operation using the button 33 or 36. When the player character 70 is aboard the bird character 78, if the button 33 or 36 is pressed, the selection image 76 switches, and the boarding target character also switches. For example, while the player character 70 is aboard the bird character 78, if the button 33 or 36 is pressed, the selection image 76 switches to the image representing the horse character 77, and the boarding target character that the player character 70 is aboard also switches from the bird character 78 to the horse character 77. If the boarding target character switches to the horse character 77, the player character 70 and the horse character 77 fall. If the player character 70 and the horse character 77 reach the ground 71, the player character 70 receives damage. If the boarding target character is switched to the bird character 78 again while the player character 70 is falling, the player character 70 and the bird character 78 do not fall, and enter the state where the player character 70 and the bird character 78 can move in the air again.

When the player character 70 is aboard the horse character 77, if the bird character 78 is selected by the selection operation using the button 33 or 36, the horse character 77 switches to the bird character 78, and the player character 70 enters the state where the player character 70 is aboard the bird character 78.

FIG. 11 is a diagram showing an example of the scene where the player character 70 jumps on the ground and boards the bird character 78.

As shown in the upper diagram of FIG. 11, in the state where the player character 70 is in the normal state, the player character 70 performs a jump action based on an operation input provided by the player. By the jump action, the player character 70 leaves the ground 71 and enters the state where the player character 70 is temporarily in the air. While the player character 70 is temporarily in the air, as shown in the upper diagram of FIG. 11, display urging the pressing of the A-button 53 and display indicating the bird character 78 are performed near the player character 70. At this time, if the A-button 53 is pressed, as shown in the lower diagram of FIG. 11, the bird character 78 appears, and the player character 70 enters the state where the player character 70 is aboard the bird character 78. As shown in the upper diagram of FIG. 11, even when an image representing a boarding target character other than the bird character 78 (e.g., the horse character 77) is displayed as the selection image 76, if the A-button 53 is pressed when the player character 70 is in the air, the player character 70 boards the bird character 78. That is, when the player character 70 is in the air, even if the selection operation for selecting a boarding target character is not performed, the player character 70 boards the bird character 78 in accordance with the pressing of the A-button 53.

Although not shown in the figures, not only in a case where the player character 70 performs a jump action, but also in a case where, for example, the player character 70 falls down a cliff, when the player character 70 is in the air, display urging the pressing of the A-button 53 and display indicating the bird character 78 are performed. If the A-button 53 is pressed at this time, the player character 70 boards the bird character 78.

FIG. 12 is a diagram showing an example of the scene where the player character 70 boards a fish character 79 when being in water.

If the player character 70 moves from the ground 71 to the area of the water surface 74, as shown in the upper diagram of FIG. 12, a part of the player character 70 goes into water, and the fish character 79 can be selected. When the player character 70 is in water in the normal state, only the fish character 79 as the water boarding target character can be selected, or the air boarding target character can also be selected in addition to the water boarding target character. For example, if the player character 70 goes into water, an image representing the fish character 79 is displayed as the selection image 76 at the lower right of the screen, and the current state enters the state where the fish character 79 is selected. At this time, a configuration may be employed in which the selection operation using the button 33 or 36 cannot be performed, and only the fish character 79 can be selected. Alternatively, if the player character 70 goes into water, as in the upper diagram of FIG. 12, the current state may enter the state where the image representing the fish character 79 is initially displayed as the selection image 76, and the fish character 79 is selected. Then, if the selection operation using the button 33 or 36 is performed in this state, the air boarding target character may be selected. Further, when the player character 70 is in water in the normal state, display urging the pressing of the A-button 53 and display indicating the fish character 79 are performed near the player character 70. If a boarding instruction is given (the plus button 57 is pressed) or the A-button 53 is pressed in this state, as shown in the lower diagram of FIG. 12, the fish character 79 appears, and the player character 70 enters the state where the player character 70 is aboard the fish character 79. When the player character 70 is in water in the normal state, any of the water boarding target character, the ground boarding target character, the air boarding target character, and the cliff surface boarding target character may be able to be selected. Among the plurality of types of boarding target characters, the water boarding target character may be preferentially (initially) selected.

In the state where the player character 70 is aboard the fish character 79, the player character 70 can move on or in water. When the player character 70 is in water in a case where the player character 70 is not aboard the fish character 79, the player character 70 receives predetermined damage. However, in a case where the player character 70 is aboard the fish character 79, the player character 70 does not receive damage. When the player character 70 is aboard the fish character 79, the player character 70 can move in the virtual space faster than when the player character 70 is on the ground 71 in the normal state.

By causing the player character 70 to board the fish character 79, it is possible to move the player character 70 on or in water. When the player character 70 is in water, it is possible to cause the player character 70 to board the fish character 79 only by pressing the A-button 53. Thus, it is possible to prevent the player character 70 from being damaged.

When the player character 70 is aboard the fish character 79, if the bird character 78 is selected by the selection operation using the button 33 or 36, the fish character 79 switches to the bird character 78, and the player character 70 enters the state where the player character 70 is aboard the bird character 78.

FIG. 13 is a diagram showing an example of the scene where the player character 70 boards a cliff surface boarding target character 80 when being near the cliff surface 75.

As shown in the upper diagram of FIG. 13, if the player character 70 moves toward the cliff surface 75, display urging the pressing of the A-button 53 and display indicating the cliff surface boarding target character 80 are performed near the player character 70. Specifically, if the player character 70 is located near the cliff surface 75 and the cliff surface 75 is in front of the player character 70, display urging the pressing of the A-button 53 and display indicating the cliff surface boarding target character are performed. At this time, if the A-button 53 is pressed, the cliff surface boarding target character 80 appears, and as shown in the lower diagram of FIG. 13, the player character 70 enters the state where the player character 70 is aboard the cliff surface boarding target character 80. If the player character 70 boards the cliff surface boarding target character 80, the current state enters the state where the cliff surface boarding target character 80 holds on to the cliff surface 75. In this state, if an operation input for moving up the cliff surface is provided, the player character 70 and the cliff surface boarding target character 80 perform the action of moving up the cliff surface 75. In the state where the cliff surface boarding target character 80 holds on to the cliff surface 75, if an operation input for moving down the cliff surface is provided, the player character 70 and the cliff surface boarding target character 80 perform the action of moving down the cliff surface 75. In the normal state, the player character 70 cannot continue to be present on the cliff surface 75, and falls along the cliff surface 75.

In the upper diagram of FIG. 13, the player can select the cliff surface boarding target character 80 using the button 33 or 36. If a boarding instruction is given (the plus button 57 is pressed) when the cliff surface boarding target character 80 is selected, the player character 70 enters the state where the player character 70 is aboard the cliff surface boarding target character 80. At this time, as shown in the lower diagram of FIG. 13, the current state enters the state where the cliff surface boarding target character 80 holds on to the cliff surface 75.

Also on the ground 71 other than near the cliff surface 75, the player can select the cliff surface boarding target character 80 by the selection operation using the button 33 or 36 and cause the player character 70 to board the cliff surface boarding target character 80. In the state where the player character 70 is aboard the cliff surface boarding target character 80, the player character 70 and the cliff surface boarding target character 80 can move on the ground 71. In a case where the player character 70 and the cliff surface boarding target character 80 come close to the cliff surface 75, if an operation input for moving up the cliff surface is provided, the player character 70 and the cliff surface boarding target character 80 start the action of moving up the cliff surface 75.

As described above, in the exemplary embodiment, the player can select any of the plurality of boarding target characters by the selection operation using the button 33 or 36 and cause the player character 70 to board the selected boarding target character in accordance with a boarding instruction. Then, in the state where the player character 70 is aboard the boarding target character, it is possible to move the player character 70 in the virtual space.

Switching between Boarding Target Characters

Next, a description is given of switching from a currently selected boarding target character to another boarding target character.

FIG. 14 is a diagram showing an example of the scene where the state where the player character 70 is aboard the air boarding target character switches to the state where the player character 70 is aboard the ground boarding target character.

As shown in the upper diagram of FIG. 14, when the player character 70 is moving in the air aboard the bird character 78, the player character 70 and the bird character 78 come close to the ground 71. When the player character 70 and the bird character 78 reach the ground 71, the state where the player character 70 is aboard the bird character 78 automatically switches to the state where the player character 70 is aboard the horse character 77. That is, if the player character 70 moves toward the ground 71, the boarding target character that the player character 70 is aboard automatically switches from the bird character 78 to the horse character 77. The selection image 76 also automatically switches from the image representing the bird character 78 to the image representing the horse character 77. Then, the player character 70 enters the state where the player character 70 is aboard the horse character 77. Thus, the player character 70 can move on the ground 71.

As described above, in a case where the player character 70 is aboard the air boarding target character, if the player character 70 moves toward the ground 71, the current state automatically switches to the state where the player character 70 is aboard the horse character 77. Even if the selection operation is not performed by the player, it is possible to automatically change the boarding target character that the player character 70 is aboard from the air boarding target character to the ground boarding target character. Thus, it is possible to smoothly switch from the movement in the air to the movement on the ground. Thus, it is possible to make a seamless movement.

FIG. 15 is a diagram showing an example of the scene where the state where the player character 70 is aboard the air boarding target character switches to the state where the player character 70 is aboard the water boarding target character.

As shown in the upper diagram of FIG. 15, when the player character 70 is moving in the air aboard the bird character 78, the player character 70 and the bird character 78 come close to the water surface 74. When the player character 70 reaches the water surface 74, the state where the player character 70 is aboard the bird character 78 automatically switches to the state where the player character 70 is aboard the fish character 79. That is, the boarding target character that the player character 70 is aboard automatically switches from the bird character 78 to the fish character 79. The selection image 76 also automatically switches from the image representing the bird character 78 to the image representing the fish character 79. Then, the player character 70 enters the state where the player character 70 is aboard the fish character 79. Thus, the player character 70 can move on or in water.

As described above, in a case where the player character 70 is aboard the air boarding target character, if the player character 70 moves toward the water surface 74, the current state automatically switches to the state where the player character 70 is aboard the fish character 79. Even if the selection operation is not performed by the player, it is possible to automatically change the boarding target character that the player character 70 is aboard from the air boarding target character to the water boarding target character. Thus, it is possible to smoothly switch from the movement in the air to the movement on or in water. Thus, it is possible to make a seamless movement.

FIG. 16 is a diagram showing an example of the scene where the state where the player character 70 is aboard the ground boarding target character switches to the state where the player character 70 is aboard the water boarding target character.

As shown in the upper diagram of FIG. 16, when the player character 70 is moving on the ground 71 aboard the horse character 77, the player character 70 and the horse character 77 come close to the water surface 74. When the player character 70 enters the area of the water surface 74, the state where the player character 70 is aboard the horse character 77 automatically switches to the state where the player character 70 is aboard the fish character 79. That is, the boarding target character that the player character 70 is aboard automatically switches from the horse character 77 to the fish character 79. The selection image 76 also automatically switches from the image representing the horse character 77 to the image representing the fish character 79. Then, the player character 70 enters the state where the player character 70 is aboard the fish character 79. Thus, the player character 70 can move on or in water.

As described above, in a case where the player character 70 is aboard the ground boarding target character, if the player character 70 moves toward the water surface 74, the current state automatically switches to the state where the player character 70 is aboard the fish character 79. Even if the selection operation is not performed by the player, it is possible to automatically change the boarding target character that the player character 70 is aboard from the ground boarding target character to the water boarding target character. Thus, it is possible to smoothly switch from the movement on the ground to the movement on or in water. Thus, it is possible to make a seamless movement.

In a case where the player character 70 is aboard the water boarding target character, if the player character 70 moves from a position on or in water toward the ground 71, the process is opposite to that in FIG. 16. That is, when the player character 70 moves on or in water aboard the water boarding target character, and when the player character 70 comes close to the ground 71 and enters the area of the ground 71, the water boarding target character automatically switches to the ground boarding target character.

The water boarding target character is automatically switched to the boarding target character that the player character 70 has previously been aboard on the ground 71 among a plurality of types of ground boarding target characters. For example, as in FIG. 16, if the player character 70 moves from the ground 71 to the water surface 74 aboard a boarding target character and then returns from the water surface 74 to the ground 71, the fish character 79 is automatically switched to the horse character 77.

Consequently, in a case where the player character 70 moves from a position on the ground onto water or moves from a position on water onto the ground, even if the selection operation is not performed, it is possible to switch boarding target characters. Thus, it is possible to seamlessly and smoothly move between different terrains.

As described above, in the exemplary embodiment, a plurality of types of boarding target characters relating to terrains are prepared, the player selects any of the plurality of types of boarding target characters by the selection operation, and the player character 70 is caused to board the selected boarding target character in accordance with a boarding instruction. The player character 70 can move in the virtual space in the state where the player character 70 is aboard the boarding target character. In a case where the player character 70 is aboard the air boarding target character, if the player character 70 moves from a position in the air to the ground 71 or the water surface 74, the air boarding target character is automatically switched to a boarding target character relating to a terrain at the movement destination. In a case where the player character 70 is aboard a boarding target character, also when the player character 70 moves from the ground 71 to the water surface 74 or when the player character 70 moves from the water surface 74 to the ground 71, the boarding target character is automatically switched to a boarding target character relating to a terrain at the movement destination. Consequently, it is possible to change a boarding target character in accordance with the terrain where the player character 70 is. Thus, it is possible to smoothly move between different terrains.

The virtual space is divided into various types of terrains (the ground, a water surface, a cliff surface, and the like), and based on the position of the player character 70 in the virtual space, it is determined which of the terrains (the ground 71, the water surface 74, and the cliff surface 75) the player character 70 is on, and whether the player character 70 is in the air. Based on the result of the determination, for example, if the state where the player character 70 is in the air aboard the air boarding target character changes to the state where the player character 70 is on the ground 71, the air boarding target character is automatically switched to the ground boarding target character. For example, if the state where the player character 70 is on the ground 71 aboard the ground boarding target character changes to the state where the player character 70 is on the water surface 74, the ground boarding target character is automatically switched to the water boarding target character.

The timing and the condition for automatically switching boarding target characters are not limited to the above. For example, the distance between the player character 70 and a terrain may be calculated, and based on the distance, boarding target characters may be automatically switched. For example, in the state where the player character 70 is in the air aboard the air boarding target character, if the distance between the player character 70 and the ground 71 is less than a predetermined value, the air boarding target character may be automatically switched to the ground boarding target character. In the state where the player character 70 is on the ground 71 aboard the ground boarding target character, if the distance between the player character 70 and the water surface 74 is less than a predetermined value, the ground boarding target character may be automatically switched to the water boarding target character.

Next, a case is described where the player character 70 moves to the cliff surface in the state where the player character 70 is aboard a boarding target character.

FIG. 17 is a diagram showing an example of the scene where the state where the player character 70 is aboard the ground boarding target character switches to the state where the player character 70 is aboard the cliff surface boarding target character. FIG. 18 is a diagram showing an example of the scene where the state where the player character 70 is aboard the air boarding target character switches to the state where the player character 70 is aboard the cliff surface boarding target character.

As shown in the upper diagram of FIG. 17, when the player character 70 is moving on the ground 71 aboard the horse character 77, the player character 70 and the horse character 77 come close to the cliff surface 75. Even if the player character 70 and the horse character 77 attempt to move further toward the cliff surface 75, the player character 70 and the horse character 77 cannot move any further, and the horse character 77 is not automatically switched to the cliff surface boarding target character 80. If the player character 70 is located near the cliff surface 75 and faces the cliff surface 75, display urging the pressing of the A-button 53 and display indicating the cliff surface boarding target character 80 are performed. Here, if the A-button 53 is pressed, the cliff surface boarding target character 80 appears, and as shown in the lower diagram of FIG. 17, the player character 70 enters the state where the player character 70 is aboard the cliff surface boarding target character 80. In this state, if an operation input for moving up the cliff surface 75 is provided, the player character 70 and the cliff surface boarding target character 80 perform the action of moving up the cliff surface 75.

The same applies to a case where the player character 70 is moving in the air aboard the bird character 78. As shown in the upper diagram of FIG. 18, when the player character 70 is moving in the air aboard the bird character 78, the player character 70 and the bird character 78 come close to the cliff surface 75. Even if the player character 70 and the bird character 78 attempt to move further toward the cliff surface 75, the player character 70 and the bird character 78 cannot move any further, and the bird character 78 is not automatically switched to the cliff surface boarding target character 80. If the player character 70 is located near the cliff surface 75 and faces the cliff surface 75, display urging the pressing of the A-button 53 and display indicating the cliff surface boarding target character 80 are performed. Here, if the A-button 53 is pressed, the cliff surface boarding target character 80 appears, and as shown in the lower diagram of FIG. 18, the player character 70 enters the state where the player character 70 is aboard the cliff surface boarding target character 80.

Although not shown in the figures, the same applies to a case where on a terrain where the water surface 74 (e.g., a river) and the cliff surface 75 are adjacent to each other, the player character 70 moves on or in water aboard the fish character 79. That is, when the player character 70 is moving on or in water aboard the fish character 79, even if the player character 70 and the fish character 79 come close to the cliff surface 75, the fish character 79 is not automatically switched to the cliff surface boarding target character 80. If the player character 70 is located near the cliff surface 75 and faces the cliff surface 75, display urging the pressing of the A-button 53 and display indicating the cliff surface boarding target character 80 are performed. Here, if the A-button 53 is pressed, the cliff surface boarding target character 80 appears, and the player character 70 enters the state where the player character 70 is aboard the cliff surface boarding target character 80.

As described above, in the exemplary embodiment, in the state where the player character 70 is aboard a boarding target character, even if the player character 70 comes close to the cliff surface 75, the boarding target character is not automatically switched to the cliff surface boarding target character 80. Then, the boarding target character is switched to the cliff surface boarding target character 80 in accordance with an operation input. For example, in a case where the player character 70 comes close to the cliff surface 75 when moving in the air, if the player character 70 automatically boards the cliff surface boarding target character 80, the movement in the air suddenly switches to the movement on the cliff surface 75. Such sudden switching may hinder the movement of the player character 70 in the air, and the player character 70 may not be able to be moved in the virtual space as intended by the player. Thus, in the exemplary embodiment, a configuration is employed in which while the player character 70 is moving in the air aboard the air boarding target character, when the player character 70 attempts to move toward the cliff surface 75, the air boarding target character is not automatically switched to the cliff surface boarding target character 80, and the air boarding target character is switched in accordance with an operation input. Consequently, it is possible to move the player character 70 in the air as intended by the player and also shift the player character 70 from a position in the air to the cliff surface in accordance with an operation input. The same applies to a case where the player character 70 is aboard the ground boarding target character and a case where the player character 70 is aboard the water boarding target character.

While the player character 70 is aboard the air boarding target character, the ground boarding target character, or the water boarding target character, if the player character 70 comes close to the cliff surface 75, display urging the player character 70 to board the cliff surface boarding target character 80 (display urging the pressing of the A-button 53 or display indicating the cliff surface boarding target character 80) is performed. Consequently, it is possible to cause the player to recognize that the player character 70 can board the cliff surface boarding target character 80 and move up the cliff surface 75. Thus, it is possible to promote the movement on the cliff surface 75.

The display urging the player character 70 to board the cliff surface boarding target character 80 is performed based on the position and the direction of the player character 70. For example, if the distance between the player character 70 and the cliff surface 75 is less than a predetermined value and the player character 70 faces the cliff surface 75, the display urging the player character 70 to board the cliff surface boarding target character 80 is performed. When the display is performed, if the A-button 53 is pressed, the player character 70 changes to the orientation of being aboard the cliff surface boarding target character 80 and moving up the cliff surface 75. In a case where the cliff surface 75 is present below the player character 70, if the player character 70 faces the opposite direction of the cliff surface 75, the display urging the player character 70 to board the cliff surface boarding target character 80 is performed. When the display is performed, if the A-button 53 is pressed, the player character 70 changes to the orientation of being aboard the cliff surface boarding target character 80 and moving down the cliff surface 75.

When boarding target characters are automatically switched, an effect image indicating the switching between the boarding target characters may be displayed, or a sound effect may be output. Also in a case where the player character 70 is caused to board a boarding target character or boarding target characters are switched in accordance with an operation input, an effect image may be displayed, or a sound effect may be output.

Details of Game Processing

Next, an example of game processing performed by the main body apparatus 2 is specifically described. First, data stored in the main body apparatus 2 is described.

Figure 19:
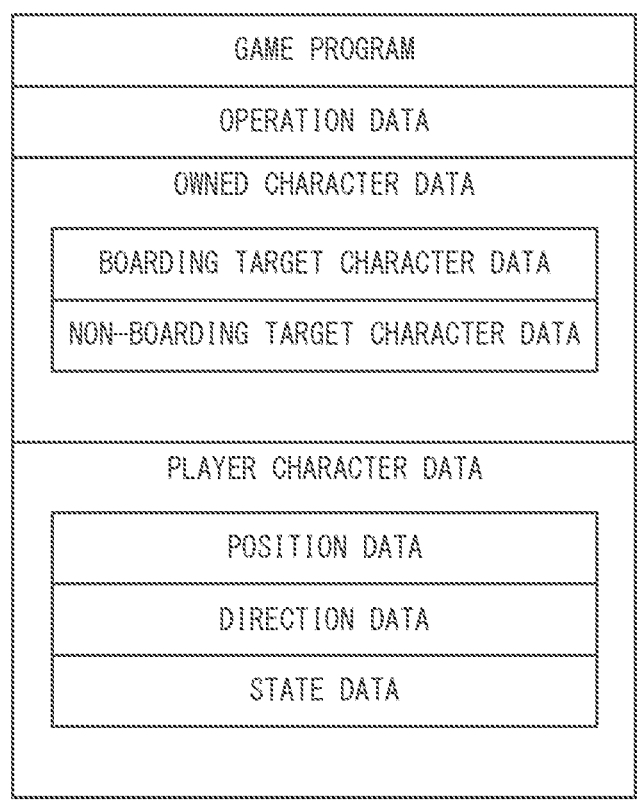
FIG. 19 is an example non-limiting diagram showing an example of data stored in a memory (mainly a DRAM 85) of the main body apparatus 2.

FIG. 19 is a diagram showing an example of data stored in a memory (mainly, the DRAM 85) of the main body apparatus 2. As shown in FIG. 19, the main body apparatus 2 stores a game program, operation data, owned character data, and player character data. In addition to these pieces of data, various pieces of data such as an enemy character that appears in the virtual space, an item use in the game, and the like are stored.

The game program is a program for executing the game according to the exemplary embodiment. For example, the game program is stored in an external storage medium. If the game is started, the game program is loaded from the external storage medium into the DRAM 85.

The operation data is data relating to an operation input provided by the player transmitted from the controllers (the left controller 3 and the right controller 4) to the main body apparatus 2. The operation data is transmitted from the controllers to the main body apparatus 2 at predetermined time intervals (e.g., 1/200-second intervals).

The owned character data is data regarding a character owned by the player character 70 and includes data regarding the name, the shape, and the like of each character owned by the player character PC. As described above, if the player character 70 encounters an enemy character in the virtual space and a predetermined condition is satisfied in a battle against the enemy character, the player character 70 acquires the enemy character. The acquired character is stored as owned character data in a memory. A character may be acquired by the player character 70 using another method other than a battle. For example, if the player character 70 talks to a character present in the virtual space, the character may be acquired. If the player character 70 succeeds in a predetermined mission, a character may be acquired. A character may be acquired by consuming in-game currency or real currency.

The owned character data includes boarding target character data and non-boarding target character data. The boarding target character data is data indicating a boarding target character that the player character 70 can board. The non-boarding target character data is data indicating a non-boarding target character that the player character 70 cannot board.

As described above, boarding target characters include one or more types of ground boarding target characters, one or more types of air boarding target characters, one or more types of water boarding target characters, and one or more types of cliff surface boarding target characters.

The player character data is data regarding the player character 70 and includes position data indicating the position of the player character 70 and direction data indicating the direction of the player character 70. The player character data also includes state data. In addition to these pieces of data, the player character data includes shape data regarding the shape of the player character 70.

The state data is data indicating the state of the player character 70 and includes data indicating whether or not the player character 70 is currently aboard a boarding target character, and data indicating the type of a boarding target character in a case where the player character 70 is aboard the boarding target character. The state data also includes data indicating the past state of the player character 70. Specifically, as the data indicating the past state, data indicating the type of the boarding target character that the player character 70 has previously been aboard is stored. For example, a case is assumed where the player character 70 boards the horse character 77 on the ground 71, the boarding target character is next changed to the bird character 78, and the player character 70 is currently aboard the bird character 78. In this case, the state data includes data indicating that the player character 70 is aboard the bird character 78 as data indicating the current state, and data indicating the horse character 77 as data indicating the past state.

Flow Charts for Game Processing

Figure 20:
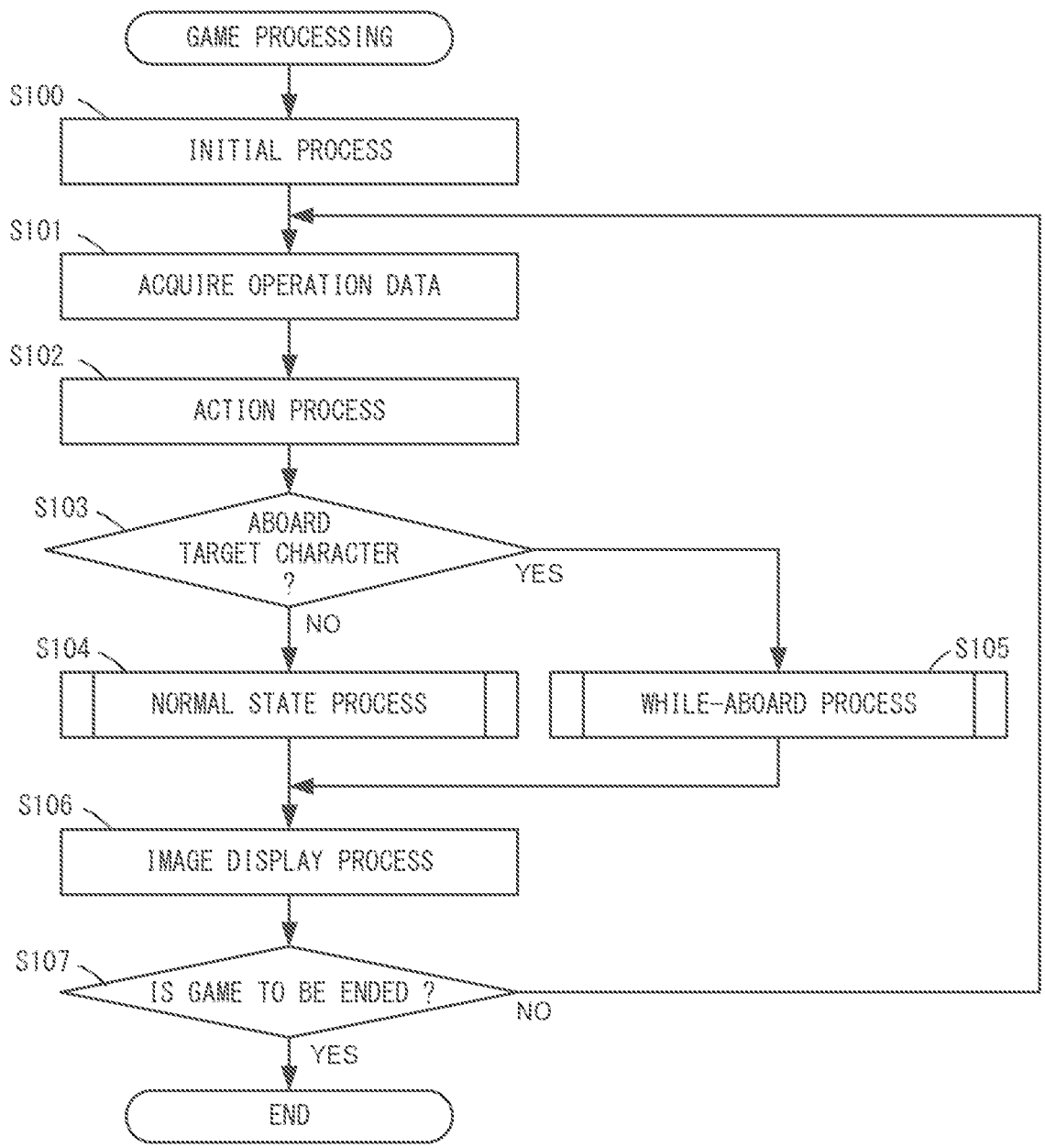
FIG. 20 is an example non-limiting flow chart showing an example of game processing performed by a processor 81 of the main body apparatus 2.

Next, a description is given of the details of the game processing performed by the main body apparatus 2. FIG. 20 is a flow chart showing an example of the game processing performed by the processor 81 of the main body apparatus 2. FIG. 20 mainly shows processes regarding the above boarding target character and omits the process of acquiring an owned character, a process regarding a battle, and other processes.

As shown in FIG. 20, first, the processor 81 performs an initial process (step S100). In the initial process, the virtual space is set, and terrains such as the ground 71, the water surface 74, the cliff surface 75, and the like are placed in the virtual space. In the virtual space, the player character 70 is also placed. Data regarding a owned character stored in association with the player character 70 is loaded into a memory.

After the process of step S100, the processor 81 executes the process of step S101. From this point onward, the processor 81 repeatedly executes the processes of steps S101 to S107 every predetermined frame time (e.g., 1/60 seconds).

In step S101, the processor 81 acquires operation data from the controllers.

Next, in step S102, based on the operation data, the processor 81 performs an action process. For example, if a predetermined operation input is provided, the processor 81 causes the player character 70 to perform a jump action. Consequently, the player character 70 enters the state where the player character 70 is temporarily in the air. When the player character 70 is aboard a boarding target character, the player character 70 performs the jump action in the state where the player character 70 is aboard the boarding target character. That is, the boarding target character also performs the jump action together with the player character 70 and enters the state where the boarding target character is temporarily in the air. Next, the processor 81 performs the process of step S103.

In step S103, the processor 81 determines whether or not the player character 70 is aboard a boarding target character. If the determination of the processor 81 is NO in step S103, next, a normal state process in step S104 is performed. If the determination is YES in step S103, next, a while-aboard process in step S105 is performed. The processes of steps S104 and S105 will be described below.

After the process of step S104 or S105 is performed, in step S106, the processor 81 performs an image display process. Specifically, based on a virtual camera placed in the virtual space, the processor 81 generates an image of the virtual space including the player character 70. Consequently, a game image based on the results of the processes of steps S101 to S105 is displayed on a display device. Next, the processor 81 performs the process of step S107.

In step S107, the processor 81 determines whether or not the game is to be ended. For example, if the player gives an instruction to end the game, the determination is YES in step S107. Then, the processor 81 ends the game processing shown in FIG. 20. If the determination is NO in step S107, the processor 81 executes the process of step S101 again.

Normal State Process

Figure 21:
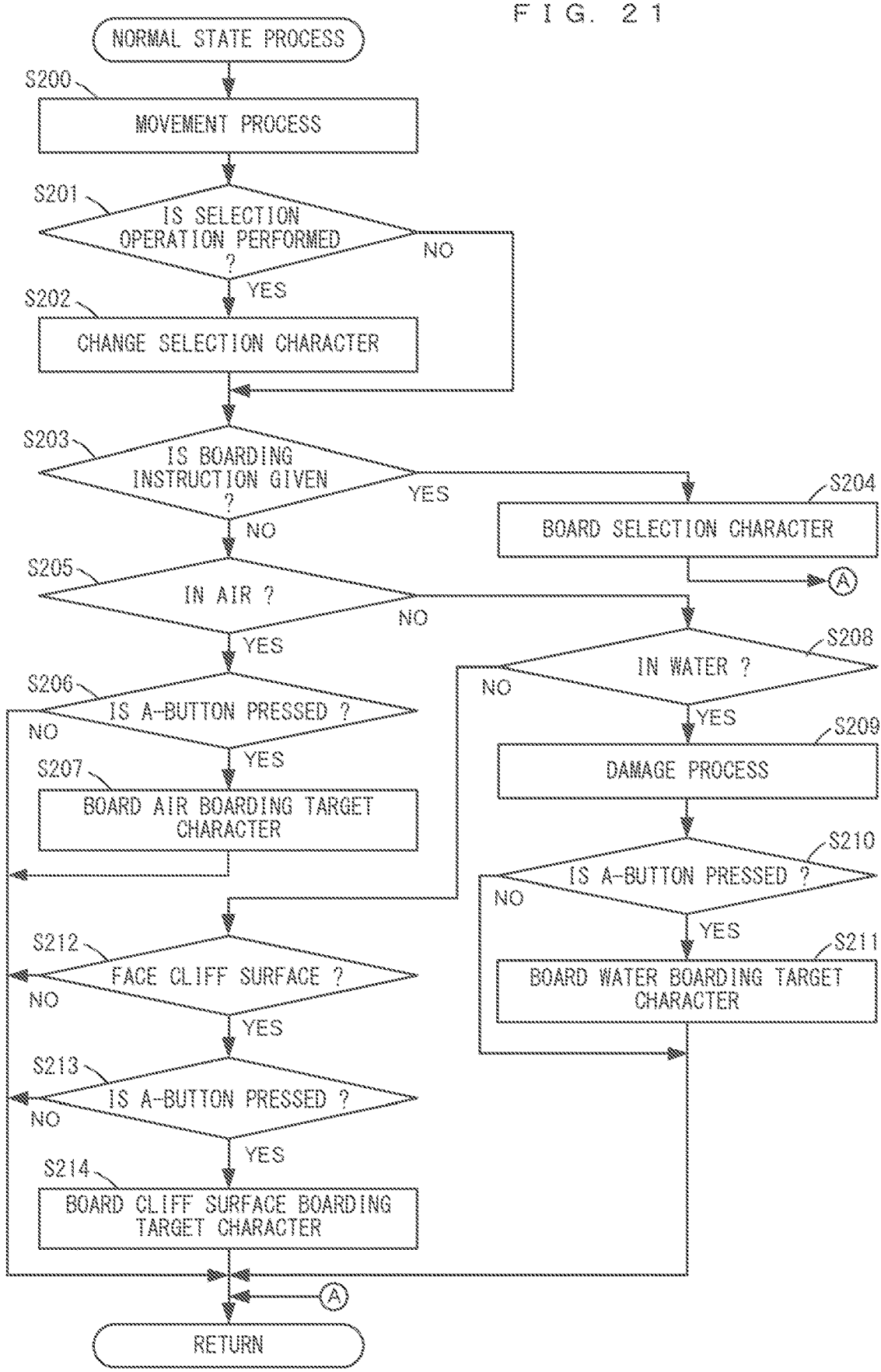
FIG. 21 is an example non-limiting flow chart showing an example of a normal state process in step S104.

Next, the details of the normal state process in step S104 are described. FIG. 21 is a flow chart showing an example of the normal state process in step S104.

In step S200, the processor 81 performs a movement process for moving the player character 70. Specifically, based on a direction input (e.g., an operation input to the analog stick 32) provided by the player, the processor 81 moves the player character 70 in the virtual space. The movement process is performed taking into account the influence of gravity acting in the down direction in the virtual space. For example, if the player character 70 is in the air, the player character 70 is moved in the down direction under the influence of gravity. Next, the processor 81 performs the process of step S201.

In step S201, the processor 81 determines whether or not the selection operation for selecting a boarding target character (e.g., the pressing of the button 33 or 36) is performed. If the determination of the processor 81 is YES in step S201, next, the process of step S202 is performed. If the determination is NO in step S201, next, the process of step S203 is performed.

In step S202, the processor 81 changes the currently selected boarding target character (a selection character). The processor 81 also displays an image representing the selection character as the selection image 76 in an area at the lower right of the screen. A configuration is employed in which boarding target characters that can be selected by the player differ in accordance with the position of the player character 70. For example, if the player character 70 is on the ground 71, the player can select the ground boarding target character, the air boarding target character, and the cliff surface boarding target character. If the player character 70 is in the area of the water surface 74, the player can select the water boarding target character and the air boarding target character. If the player character 70 is in the air, the player can select the air boarding target character and the ground boarding target character. If the player character 70 is on the cliff surface 75, the player can select the cliff surface boarding target character, the ground boarding target character, and the air boarding target character. Here, any of the plurality of boarding target characters that can be selected is selected.

In step S203, the processor 81 determines whether or not a boarding instruction (e.g., the pressing of the plus button 57) to cause the player character 70 to board the selection character is given. If the determination of the processor 81 is YES in step S203, next, the process of step S204 is performed. If the determination is NO in step S203, next, the process of step S205 is performed.

In step S204, the processor 81 causes the player character 70 to board the selection character changed in step S204. For example, in a case where the player character 70 is on the ground 71, if the horse character 77 is selected as the selection character, the processor 81 causes the player character 70 to board the horse character 77. In a case where the player character 70 is on the ground 71, if the bird character 78 is selected as the selection character, the processor 81 causes the player character 70 to board the bird character 78. In a case where the player character 70 is on the water surface 74, if the fish character 79 is selected as the selection character, the processor 81 causes the player character 70 to board the fish character 79. In a case where the player character 70 is on the ground 71, if the cliff surface boarding target character 80 is selected as the selection character, the processor 81 causes the player character 70 to board the cliff surface boarding target character 80. If the process of step S204 is performed, the processor 81 ends the normal state process in FIG. 21.

On the other hand, in step S205, the processor 81 determines whether or not the player character 70 is in the air. If the determination of the processor 81 is YES in step S205, next, the process of step S206 is performed. If the determination is NO in step S205, next, the process of step S208 is performed. If the determination of the processor 81 is YES in step S205, display urging the pressing of the A-button 53 and display indicating the air boarding target character (e.g., the bird character 78) are performed (see FIG. 11).

In step S206, the processor 81 determines whether or not the A-button 53 is pressed. If the determination of the processor 81 is YES in step S206, next, the process of step S207 is performed. If the determination is NO in step S206, the normal state process in FIG. 21 ends.

In step S207, the processor 81 causes the player character 70 to board the air boarding target character. Consequently, the player character 70 enters the state where the player character 70 can move in the air aboard the air boarding target character (e.g., the bird character 78). If the process of step S207 is performed, the processor 81 ends the normal state process in FIG. 21.

On the other hand, in step S208, the processor 81 determines whether or not the player character 70 is in water. If the determination of the processor 81 is YES in step S208, next, the process of step S209 is performed. If the determination is NO in step S208, next, the process of step S212 is performed. If the determination of the processor 81 is YES in step S208, display urging the pressing of the A-button 53 and display indicating the water boarding target character (e.g., the fish character 79) are performed (see FIG. 12).

In step S209, the processor 81 performs a damage process for causing predetermined damage to the player character 70. Specifically, in the damage process, if the time elapsed since the player character 70 goes into water is a predetermined time or less, the player character 70 performs the action of swimming in water. If the elapsed time exceeds the predetermined time, the player character 70 sinks into water, and damage is caused to the player character 70. If the damage is caused to the player character 70, the player character 70 is changed back to the previous state (the state before the player character 70 goes into water; the state where the player character 70 is on the ground). While the player character 70 is in water, damage may be continuously caused to the player character 70, and if the caused damage exceeds a threshold, the player character 70 may sink into water and be changed back to the previous state.

Next, in step S210, the processor 81 determines whether or not the A-button 53 is pressed. If the determination of the processor 81 is YES in step S210, next, the process of step S211 is performed. If the determination is NO in step S210, the normal state process in FIG. 21 ends.

In step S211, the processor 81 causes the player character 70 to board the water boarding target character. Consequently, the player character 70 enters the state where the player character 70 can move on or in water aboard the water boarding target character (e.g., the fish character 79). If the process of step S211 is performed, the processor 81 ends the normal state process in FIG. 21.

On the other hand, in step S212, the processor 81 determines whether or not the player character 70 faces the cliff surface 75. Here, based on the position and the direction of the player character 70, the processor 81 determines whether or not the player character 70 is located near the cliff surface 75 and faces the cliff surface 75. If the determination of the processor 81 is YES in step S212, next, the process of step S213 is performed. If the determination is NO in step S212, the normal state process in FIG. 21 ends. If the determination of the processor 81 is YES in step S212, display urging the pressing of the A-button 53 and display indicating the cliff surface boarding target character 80 are performed (see FIG. 13).

In step S213, the processor 81 determines whether or not the A-button 53 is pressed. If the determination of the processor 81 is YES in step S213, next, the process of step S214 is performed. If the determination is NO in step S213, the normal state process in FIG. 21 ends.

In step S214, the processor 81 causes the player character 70 to board the cliff surface boarding target character 80. Consequently, the player character 70 enters the state where the player character 70 can move on the cliff surface 75 or the ground 71 aboard the cliff surface boarding target character 80. If the process of step S214 is performed, the processor 81 ends the normal state process in FIG. 21.

While-Aboard Process

Figure 22:
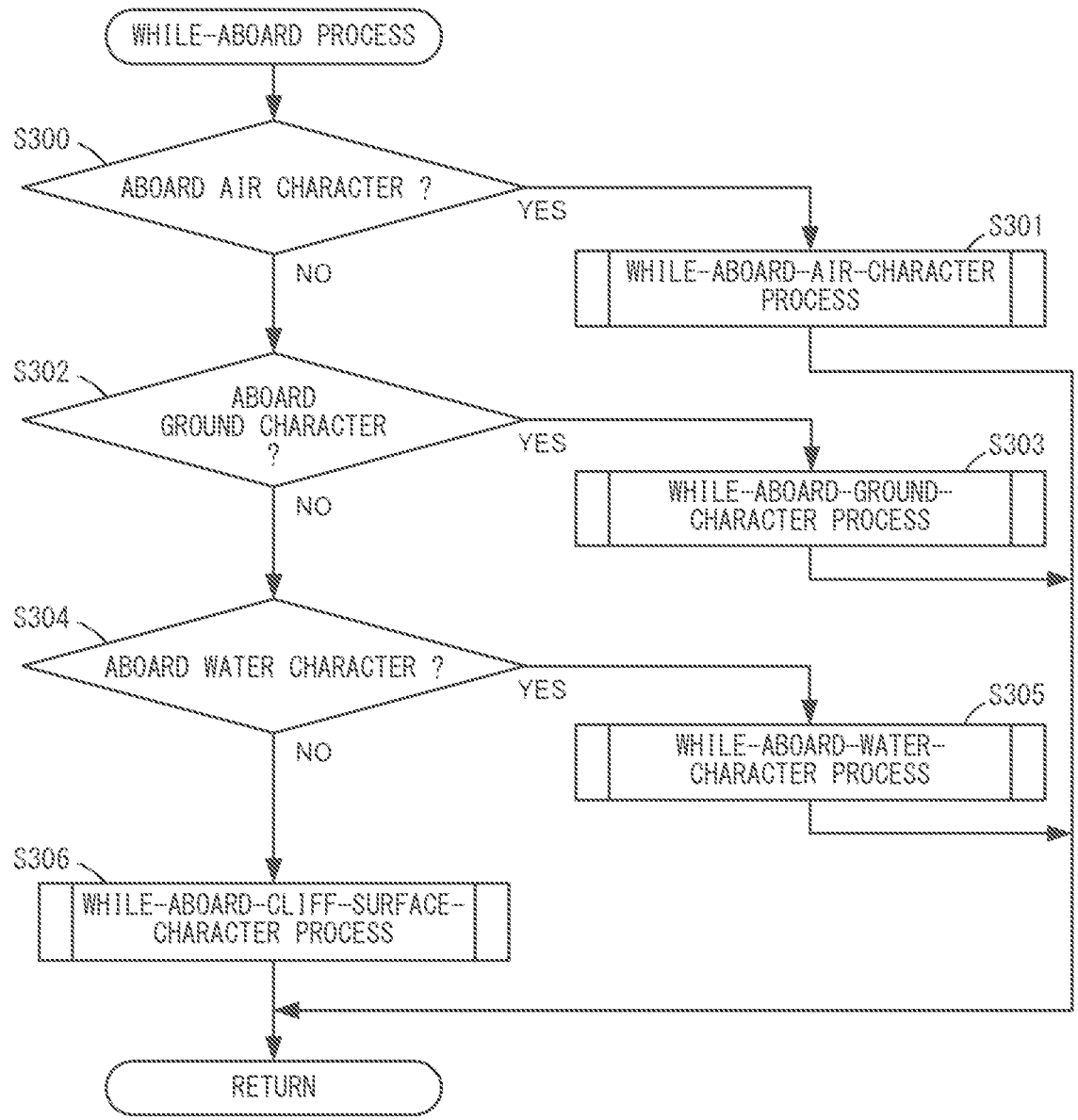
FIG. 22 is an example non-limiting flow chart showing an example of a while-aboard process in step S105.

Next the details of the while-aboard process in step S105 is described. FIG. 22 is a flow chart showing an example of the while-aboard process in step S105.

In step S300, the processor 81 determines whether or not the player character 70 is aboard the air boarding target character. If the determination of the processor 81 is YES in step S300, next, the process of step S301 is performed. If the determination is NO in step S300, next, the process of step S302 is performed.

In step S301, the processor 81 performs a while-aboard-air-character process. The while-aboard-air-character process is a process when the player character 70 is aboard the air boarding target character. The details of the while-aboard-air-character process will be described below. If the process of step S301 is performed, the processor 81 ends the while-aboard process in FIG. 22.

In step S302, the processor 81 determines whether or not the player character 70 is aboard the ground boarding target character. If the determination of the processor 81 is YES in step S302, next, the process of step S303 is performed. If the determination is NO in step S302, next, the process of step S304 is performed.

In step S303, the processor 81 performs a while-aboard-ground-character process. The while-aboard-ground-character process is a process when the player character 70 is aboard the ground boarding target character. The details of the while-aboard-ground-character process will be described below. If the process of step S303 is performed, the processor 81 ends the while-aboard process in FIG. 22.

In step S304, the processor 81 determines whether or not the player character 70 is aboard the water boarding target character. If the determination of the processor 81 is YES in step S304, next, the process of step S305 is performed. If the determination is NO in step S304, next, the process of step S306 is performed.

In step S305, the processor 81 performs a while-aboard-water-character process. The while-aboard-water-character process is a process when the player character 70 is aboard the water boarding target character. The details of the while-aboard-water-character process will be described below. If the process of step S305 is performed, the processor 81 ends the while-aboard process in FIG. 22.

In step S306, the processor 81 performs a while-aboard-cliff-surface-character process. The while-aboard-cliff-surface-character process is a process when the player character 70 is aboard the cliff surface boarding target character. The details of the while-aboard-cliff-surface-character process will be described below. If the process of step S306 is performed, the processor 81 ends the while-aboard process in FIG. 22.

While-Aboard-Air-Character Process

Next, the details of the while-aboard-air-character process in step S301 are described. FIG. 23 is a flow chart showing an example of the while-aboard-air-character process in step S301.

In step S310, the processor 81 performs a movement process for moving the player character 70 together with the air boarding target character in the air. Specifically, based on a direction input (e.g., an operation input to the analog stick 32) provided by the player, the processor 81 moves the player character 70 and the air boarding target character in the air. In accordance with the input direction, the processor 81 moves the player character 70 and the air boarding target character in the up, down, left, and right directions in the virtual space. Next, the processor 81 performs the process of step S311.

In step S311, the processor 81 determines whether or not the selection operation (e.g., the pressing of the button 33 or 36) is performed. If the determination of the processor 81 is YES in step S311, next, the process of step S312 is performed. If the determination is NO in step S311, next, the process of step S313 is performed.

In step S312, the processor 81 changes the character that the player character 70 is aboard. When the player character 70 is aboard a boarding target character, even if a boarding instruction is not given, a selection character is changed in accordance with the selection operation (e.g., the pressing of the button 33 or 36), and the player character 70 enters the state where the player character 70 is aboard the changed selection character. An image representing the changed selection character is also displayed as the selection image 76. For example, if the button 33 is pressed once, the horse character 77 is selected, and the player character 70 enters the state where the player character 70 is aboard the horse character 77. If the button 33 is pressed once more, the horse character 77 is changed to another ground boarding target character. In the state where the player character 70 is aboard the ground boarding target character, the player character 70 and the ground boarding target character cannot continue to be present in the air, and fall. If the process of step S312 is performed, the processor 81 ends the while-aboard-air-character process in FIG. 23.

In step S313, the processor 81 determines whether or not the player character 70 and the air boarding target character are moving toward the ground 71. For example, based on the height of the player character 70, the processor 81 determines whether or not the player character 70 and the air boarding target character reach the ground 71. If the determination of the processor 81 is YES in step S313, next, the process of step S314 is performed. If the determination is NO in step S313, next, the process of step S315 is performed.

In step S314, the processor 81 changes the character that the player character 70 is aboard to the ground boarding target character or the cliff surface boarding target character. Consequently, the character that the player character 70 is aboard is automatically changed from the air boarding target character to the ground boarding target character or the cliff surface boarding target character. In the exemplary embodiment, a plurality of characters including the horse character 77 are prepared as ground boarding target characters. A plurality of cliff surface boarding target characters may be prepared. Here, the character that the player character 70 is aboard is changed to a character relating to data indicating the past state stored as the state data among the plurality of ground boarding target characters and cliff surface boarding target characters. That is, the character that the player character 70 is aboard is automatically changed to the character that the player character 70 has previously been aboard on the ground 71. The character that the player character 70 is aboard may be automatically changed to a character randomly selected among the plurality of boarding target characters (ground boarding target characters and cliff surface boarding target characters) capable of moving on the ground 71. If the process of step S314 is performed, the processor 81 ends the while-aboard-air-character process in FIG. 23.

In step S315, the processor 81 determines whether or not the player character 70 and the air boarding target character are moving toward the water surface 74. For example, based on the height of the player character 70, the processor 81 determines whether or not the player character 70 and the air boarding target character reach the water surface 74. If the determination of the processor 81 is YES in step S315, next, the process of step S316 is performed. If the determination is NO in step S315, next, the process of step S317 is performed.

In step S316, the processor 81 changes the character that the player character 70 is aboard to the water boarding target character. Consequently, the character that the player character 70 is aboard is automatically changed from the air boarding target character to the water boarding target character (specifically, the fish character 79). A plurality of water boarding target characters including the fish character 79 may be prepared. In this case, the character that the player character 70 is aboard is automatically changed to any of the plurality of water boarding target characters. For example, the character that the player character 70 is aboard may be automatically changed to a character that the player character 70 has previously been aboard on water among the plurality of water boarding target characters. The character that the player character 70 is aboard may be automatically changed to a character randomly selected among the plurality of water boarding target characters. If the process of step S316 is performed, the processor 81 ends the while-aboard-air-character process in FIG. 23.

In step S317, the processor 81 determines whether or not the player character 70 and the air boarding target character is moving toward the cliff surface 75. For example, based on the position and the direction of the player character 70, the processor 81 determines whether or not the player character 70 and the air boarding target character are located near the cliff surface 75 and the player character 70 faces the cliff surface 75. If the determination of the processor 81 is YES in step S317, next, the process of step S318 is performed. If the determination is NO in step S317, the while-aboard-air-character process in FIG. 23 ends. If the determination of the processor 81 is YES in step S317, display urging the pressing of the A-button 53 and display indicating the cliff surface boarding target character 80 are performed (see FIG. 18).

In step S318, the processor 81 determines whether or not the A-button 53 is pressed. If the determination of the processor 81 is YES in step S318, next, the process of step S319 is performed. If the determination is NO in step S318, the while-aboard-air-character process in FIG. 23 ends.

In step S319, the processor 81 changes the character that the player character 70 is aboard to the cliff surface boarding target character 80. Consequently, the player character 70 enters the state where the player character 70 can move on the cliff surface 75 aboard the cliff surface boarding target character 80. A plurality of cliff surface boarding target characters may be prepared. In this case, the character that the player character 70 is aboard may be changed to the character that the player character 70 has previously been aboard on the cliff surface 75 among the plurality of cliff surface boarding target characters. The character that the player character 70 is aboard may be automatically changed to a character randomly selected among the plurality of cliff surface boarding target characters. If the process of step S319 is performed, the processor 81 ends the while-aboard-air-character process in FIG. 23.

While-Aboard-Ground-Character Process

Figure 24:
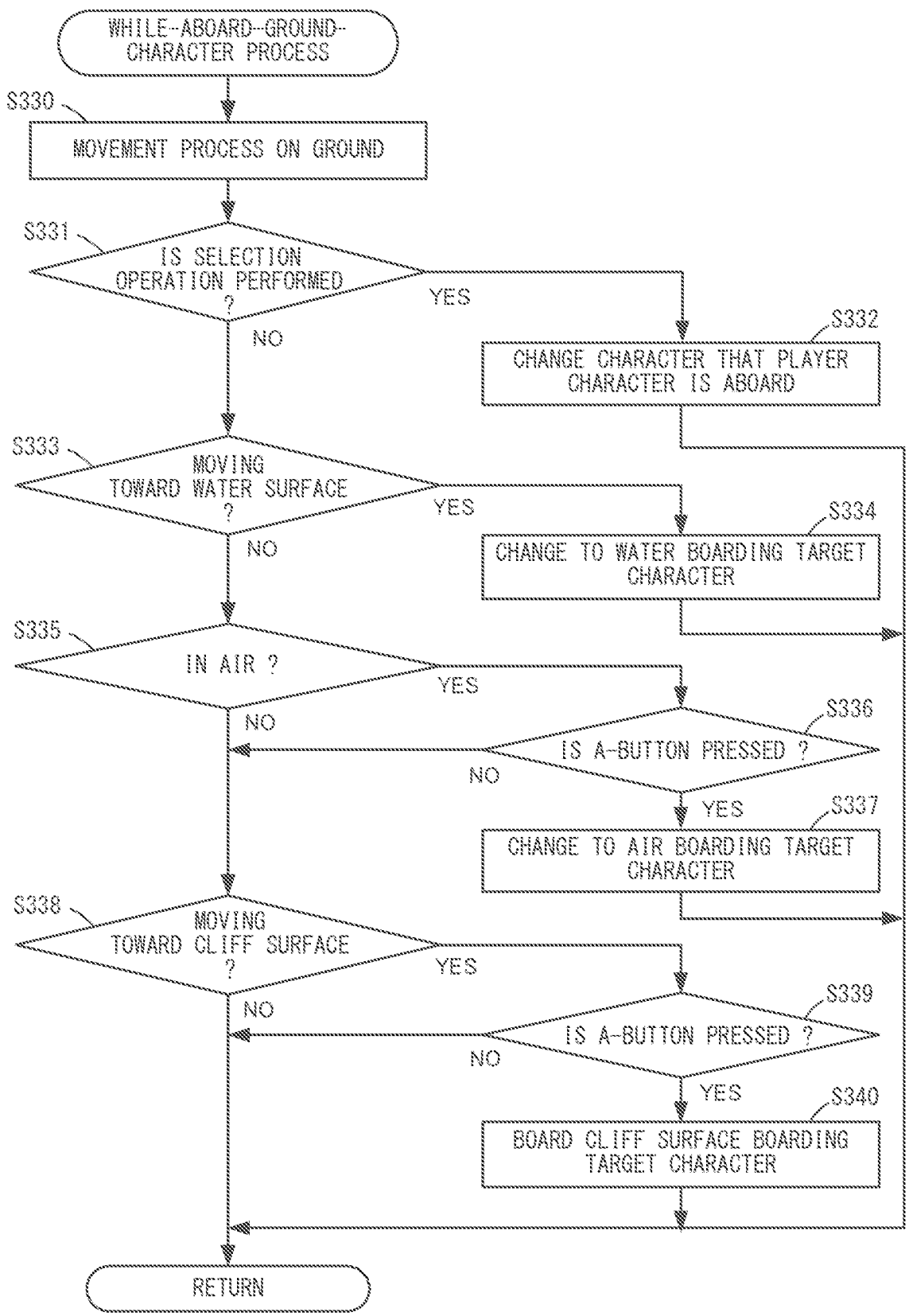
FIG. 24 is an example non-limiting flow chart showing an example of a while-aboard-ground-character process in step S303.

Next, the details of the while-aboard-ground-character process in step S303 are described. FIG. 24 is a flow chart showing an example of the while-aboard-ground-character process in step S303.

In step S330, the processor 81 performs a movement process for moving the player character 70 together with the ground boarding target character on the ground 71. Specifically, based on a direction input (e.g., an operation input to the analog stick 32) provided by the player, the processor 81 moves the player character 70 and the ground boarding target character on the ground 71. Next, the processor 81 performs the process of step S331.

In step S331, the processor 81 determines whether or not the selection operation is performed. If the determination of the processor 81 is YES in step S331, next, the process of step S332 is performed. If the determination is NO in step S331, next, the process of step S333 is performed.

In step S332, the processor 81 changes the character that the player character 70 is aboard. For example, while the player character 70 is aboard the horse character 77, if the button 33 is pressed once, a ground boarding target character different from the horse character 77 is selected, and the player character 70 enters the state where the player character 70 is aboard the ground boarding target character. If the button 33 is pressed once more, the bird character 78 is selected, and the player character 70 enters the state where the player character 70 is aboard the bird character 78. If the process of step S332 is performed, the processor 81 ends the while-aboard-ground-character process in FIG. 24.

In step S333, the processor 81 determines whether or not the player character 70 and the ground boarding target character are moving toward the water surface 74. For example, based on the position of the player character 70, the processor 81 determines whether or not the player character 70 enters the area of the water surface 74. If the determination of the processor 81 is YES in step S333, next, the process of step S334 is performed. If the determination is NO in step S333, next, the process of step S335 is performed.

In step S334, the processor 81 changes the character that the player character 70 is aboard to the water boarding target character. Consequently, the character that the player character 70 is aboard is automatically changed from the ground boarding target character to the water boarding target character (specifically, the fish character 79). In a case where a plurality of water boarding target characters are prepared, for example, the character that the player character 70 is aboard may be automatically changed to the character that the player character 70 has previously been aboard on water among the plurality of water boarding target characters. The character that the player character 70 is aboard may be automatically changed to a character randomly selected among the plurality of water boarding target characters. If the process of step S334 is performed, the processor 81 ends the while-aboard-ground-character process in FIG. 24.

In step S335, the processor 81 determines whether or not the player character 70 and the ground boarding target character are in the air. For example, if a jump action is performed while the player character 70 is aboard the ground boarding target character, the player character 70 leaves the ground 71 and enters the state where the player character 70 is temporarily in the air. If the player character 70 and the ground boarding target character fall from the cliff while the player character 70 is aboard the ground boarding target character, the player character 70 enters the state where the player character 70 is temporarily in the air. If the determination of the processor 81 is YES in step S335, next, the process of step S336 is performed. If the determination is NO in step S335, next, the process of step S338 is performed. If the determination of the processor 81 is YES in step S335, display urging the pressing of the A-button 53 and display indicating the air boarding target character are performed.

In step S336, the processor 81 determines whether or not the A-button 53 is pressed. If the determination of the processor 81 is YES in step S336, next, the process of step S337 is performed. If the determination is NO in step S336, next, the process of step S338 is performed.

In step S337, the processor 81 changes the character that the player character 70 is aboard to the air boarding target character. Consequently, the player character 70 enters the state where the player character 70 can move in the air aboard the air boarding target character (specifically, the bird character 78). A plurality of air boarding target characters including the bird character 78 may be prepared. In this case, for example, the character that the player character 70 is aboard may be changed to the character that the player character 70 has previously been aboard in the air among the plurality of air boarding target characters. The character that the player character 70 is aboard may be changed to a character randomly selected among the plurality of air boarding target characters. If the process of step S337 is performed, the processor 81 ends the while-aboard-ground-character process in FIG. 24.

In step S338, the processor 81 determines whether or not the player character 70 and the ground boarding target character are moving toward the cliff surface 75. For example, based on the position and the direction of the player character 70, the processor 81 determines whether or not the player character 70 and the ground boarding target character are located near the cliff surface 75 and the player character 70 faces the cliff surface 75. If the determination of the processor 81 is YES in step S338, next, the process of step S339 is performed. If the determination is NO in step S338, the while-aboard-ground-character process in FIG. 24 ends. If the determination of the processor 81 is YES in step S338, display urging the pressing of the A-button 53 and display indicating the cliff surface boarding target character 80 are performed.

In step S339, the processor 81 determines whether or not the A-button 53 is pressed. If the determination of the processor 81 is YES in step S339, next, the process of step S340 is performed. If the determination is NO in step S339, the while-aboard-ground-character process in FIG. 24 ends.

In step S340, the processor 81 changes the character that the player character 70 is aboard to the cliff surface boarding target character 80. Consequently, the player character 70 enters the state where the player character 70 can move on the cliff surface 75 or the ground 71 aboard the cliff surface boarding target character 80. If the process of step S340 is performed, the processor 81 ends the while-aboard-ground-character process in FIG. 24.

While-Aboard-Water-Character Process

Figure 25:
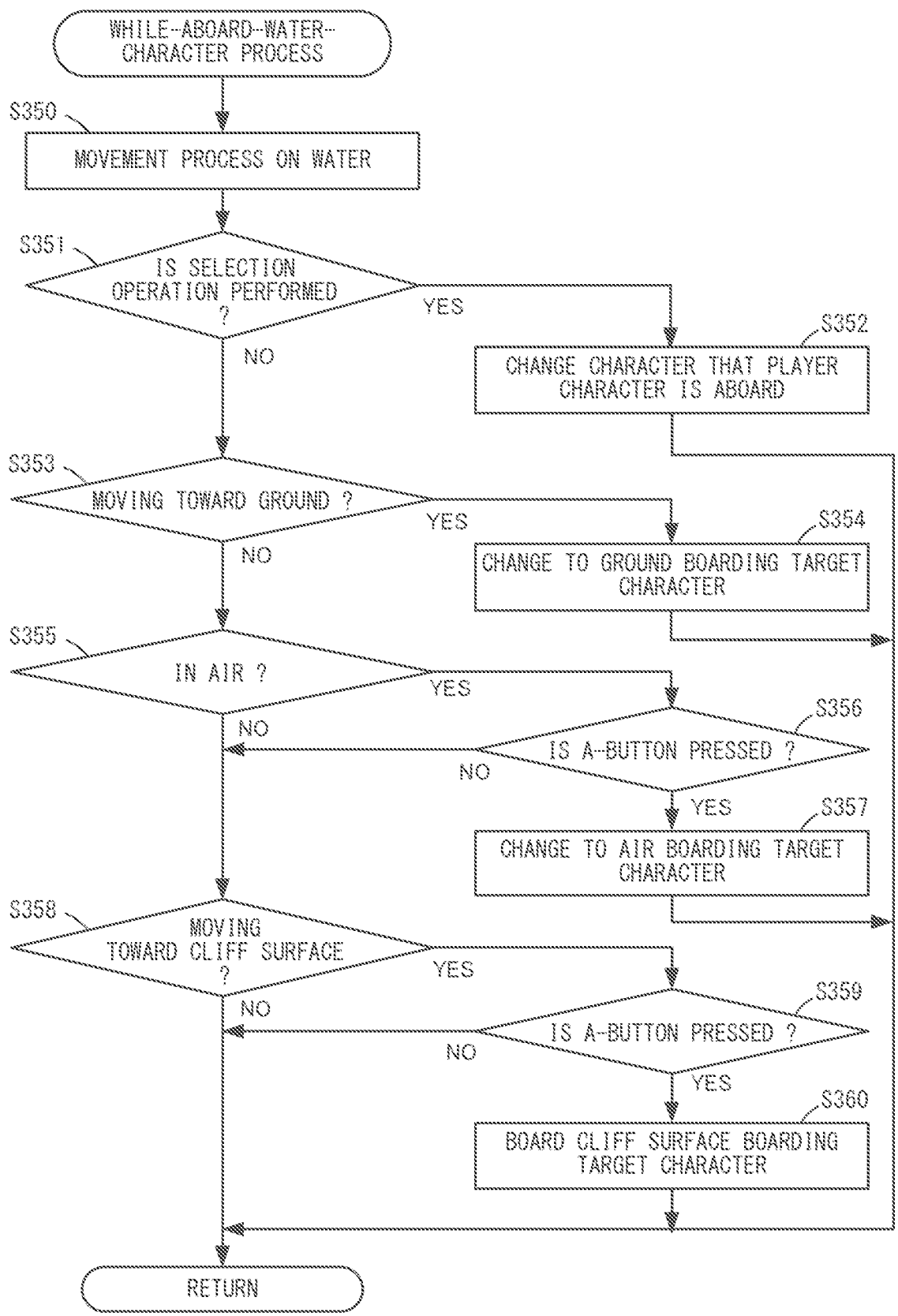
FIG. 25 is an example non-limiting flow chart showing an example of a while-aboard-water-character process in step S305.

Next, the details of the while-aboard-water-character process in step S305 are described. FIG. 25 is a flow chart showing an example of the while-aboard-water-character process in step S305.

In step S350, the processor 81 performs a movement process for moving the player character 70 together with the water boarding target character on water. Specifically, based on a direction input provided by the player, the processor 81 moves the player character 70 and the water boarding target character on or in water. Next, the processor 81 performs the process of step S351.

In step S351, the processor 81 determines whether or not the selection operation is performed. If the determination of the processor 81 is YES in step S351, next, the process of step S352 is performed. If the determination is NO in step S351, next, the process of step S353 is performed.

In step S352, the processor 81 changes the character that the player character 70 is aboard. For example, while the player character 70 is aboard the fish character 79, if the button 33 is pressed, the bird character 78 is selected, and the player character 70 enters the state where the player character 70 is aboard the bird character 78. If the process of step S352 is performed, the processor 81 ends the while-aboard-water-character process in FIG. 25.

In step S353, the processor 81 determines whether or not the player character 70 and the water boarding target character are moving toward the ground 71. For example, based on the position of the player character 70, the processor 81 determines whether or not the player character 70 enters the area of the ground 71. If the determination of the processor 81 is YES in step S353, next, the process of step S354 is performed. If the determination is NO in step S353, next, the process of step S355 is performed.

In step S354, the processor 81 changes the character that the player character 70 is aboard to the ground boarding target character. Consequently, the character that the player character 70 is aboard is automatically changed from the water boarding target character to the ground boarding target character. In the exemplary embodiment, a plurality of characters including the horse character 77 are prepared as ground boarding target characters. Here, the character that the player character 70 is aboard is changed to a character relating to data indicating the past state stored as the state data among the plurality of ground boarding target characters. That is, the character that the player character 70 is aboard is automatically changed to the ground boarding target character that the player character 70 has previously been aboard on the ground 71. If the process of step S354 is performed, the processor 81 ends the while-aboard-water-character process in FIG. 25.

In step S355, the processor 81 determines whether or not the player character 70 and the water boarding target character are in the air. For example, if a jump action is performed while the player character 70 is aboard the water boarding target character, the player character 70 and the water boarding target character leave the water surface 74 and enter the state where the player character 70 and the water boarding target character are temporarily in the air. If the determination of the processor 81 is YES in step S355, next, the process of step S356 is performed. If the determination is NO in step S355, next, the process of step S358 is performed. If the determination of the processor 81 is YES in step S355, display urging the pressing of the A-button 53 and display indicating the air boarding target character are performed.

In step S356, the processor 81 determines whether or not the A-button 53 is pressed. If the determination of the processor 81 is YES in step S356, next, the process of step S357 is performed. If the determination is NO in step S356, next, the process of step S358 is performed.

In step S357, the processor 81 changes the character that the player character 70 is aboard to the air boarding target character. Consequently, the player character 70 enters the state where the player character 70 can move in the air aboard the air boarding target character (e.g., the bird character 78). If the process of step S357 is performed, the processor 81 ends the while-aboard-water-character process in FIG. 25.

In step S358, the processor 81 determines whether or not the player character 70 and the water boarding target character are moving toward the cliff surface 75. For example, based on the position and the direction of the player character 70, the processor 81 determines whether or not the player character 70 and the water boarding target character are located near the cliff surface 75 and the player character 70 faces the cliff surface 75. If the determination of the processor 81 is YES in step S358, next, the process of step S359 is performed. If the determination is NO in step S358, the while-aboard-water-character process in FIG. 25 ends. If the determination of the processor 81 is YES in step S358, display urging the pressing of the A-button 53 and display indicating the cliff surface boarding target character 80 are performed.

In step S359, the processor 81 determines whether or not the A-button 53 is pressed. If the determination of the processor 81 is YES in step S359, next, the process of step S360 is performed. If the determination is NO in step S359, the while-aboard-water-character process in FIG. 25 ends.

In step S360, the processor 81 changes the character that the player character 70 is aboard to the cliff surface boarding target character 80. Consequently, the player character 70 enters the state where the player character 70 can move on the cliff surface 75 or the ground 71 aboard the cliff surface boarding target character 80. If the process of step S360 is performed, the processor 81 ends the while-aboard-water-character process in FIG. 25.

While-Aboard-Cliff-Surface-Character Process

Figure 26:
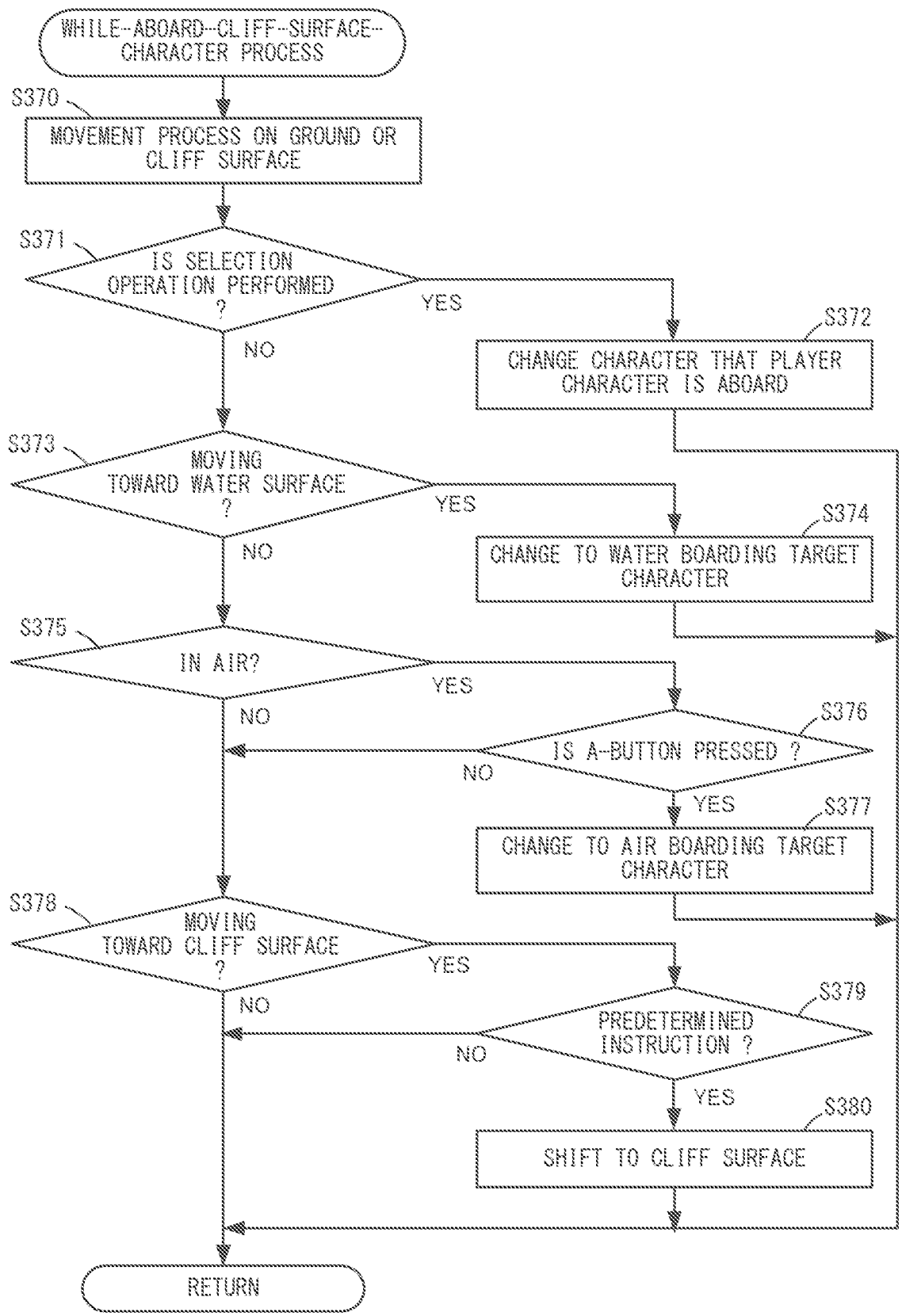
FIG. 26 is an example non-limiting flow chart showing an example of a while-aboard-cliff-surface-character process in step S306.

Next, the details of the while-aboard-cliff-surface-character process in step S306 are described. FIG. 26 is a flow chart showing an example of the while-aboard-cliff-surface-character process in step S306.

In step S370, the processor 81 performs a movement process for moving the player character 70 together with the cliff surface boarding target character on the ground 71 or the cliff surface 75. Specifically, if the player character 70 is on the ground 71, the processor 81 moves the player character 70 and the cliff surface boarding target character on the ground 71 based on a direction input. If the player character 70 is on the cliff surface 75, the processor 81 moves the player character 70 and the cliff surface boarding target character on the cliff surface 75 based on an operation input. Next, the processor 81 performs the process of step S371.

In step S371, the processor 81 determines whether or not the selection operation is performed. If the determination of the processor 81 is YES in step S371, next, the process of step S372 is performed. If the determination is NO in step S371, next, the process of step S373 is performed.

In step S372, the processor 81 changes the character that the player character 70 is aboard. For example, while the player character 70 is aboard the cliff surface boarding target character 80, if the button 33 is pressed once, the ground boarding target character is selected, and the player character 70 enters the state where the player character 70 is aboard the ground boarding target character. If the button 36 is pressed once, the bird character 78 is selected, and the player character 70 enters the state where the player character 70 is aboard the bird character 78. If the process of step S372 is performed, the processor 81 ends the while-aboard-cliff-surface-character process in FIG. 26.

In step S373, the processor 81 determines whether or not the player character 70 and the cliff surface boarding target character are moving toward the water surface 74. For example, based on the position of the player character 70, the processor 81 determines whether or not the player character 70 enters the area of the water surface 74. If the determination of the processor 81 is YES in step S373, next, the process of step S374 is performed. If the determination is NO in step S373, next, the process of step S375 is performed.

In step S374, the processor 81 changes the character that the player character 70 is aboard to the water boarding target character. Consequently, the character that the player character 70 is aboard is automatically changed from the cliff surface boarding target character to the water boarding target character (specifically, the fish character 79). In a case where a plurality of water boarding target characters are prepared, for example, the character that the player character 70 is aboard may be automatically changed to the character that the player character 70 has previously been aboard on water among the plurality of water boarding target characters. The character that the player character 70 is aboard may be automatically changed to a character randomly selected among the plurality of water boarding target characters. If the process of step S374 is performed, the processor 81 ends the while-aboard-cliff-surface-character process in FIG. 26.

In step S375, the processor 81 determines whether or not the player character 70 and the cliff surface boarding target character are in the air. For example, if a jump action is performed while the player character 70 is aboard the cliff surface boarding target character, the player character 70 and the cliff surface boarding target character leave the ground 71 and enter the state where the player character 70 and the cliff surface boarding target character are temporarily in the air. If the determination of the processor 81 is YES in step S375, next, the process of step S376 is performed. If the determination is NO in step S375, next, the process of step S378 is performed. If the determination of the processor 81 is YES in step S375, display urging the pressing of the A-button 53 and display indicating the air boarding target character are performed.

In step S376, the processor 81 determines whether or not the A-button 53 is pressed. If the determination of the processor 81 is YES in step S376, next, the process of step S377 is performed. If the determination is NO in step S376, next, the process of step S378 is performed.

In step S377, the processor 81 changes the character that the player character 70 is aboard to the air boarding target character. Consequently, the player character 70 enters the state where the player character 70 can move in the air aboard the air boarding target character (specifically, the bird character 78). A plurality of air boarding target characters including the bird character 78 may be prepared. In this case, for example, the character that the player character 70 is aboard may be changed to the character that the player character 70 has previously been aboard in the air among the plurality of air boarding target characters. The character that the player character 70 is aboard may be changed to a character randomly selected among the plurality of air boarding target characters. If the process of step S377 is performed, the processor 81 ends the while-aboard-cliff-surface-character process in FIG. 26.

In step S378, the processor 81 determines whether or not the player character 70 and the cliff surface boarding target character are located on the ground 71 and are moving toward the cliff surface 75. For example, based on the position and the direction of the player character 70, the processor 81 determines whether or not the player character 70 and the cliff surface boarding target character are located near the cliff surface 75 and the player character 70 faces the cliff surface 75. If the determination of the processor 81 is YES in step S378, next, the process of step S379 is performed. If the determination is NO in step S378, the while-aboard-cliff-surface-character process in FIG. 26 ends. If the determination of the processor 81 is YES in step S378, display urging an operation for moving up or moving down the cliff surface 75 is performed.

In step S379, the processor 81 determines whether or not a predetermined instruction to move up or move down the cliff surface 75 is given. If the determination of the processor 81 is YES in step S379, next, the process of step S380 is performed. If the determination is NO in step S379, the while-aboard-cliff-surface-character process in FIG. 26 ends.

In step S380, the processor 81 shifts the player character 70 and the cliff surface boarding target character 80 to the cliff surface 75. Consequently, the player character 70 and the cliff surface boarding target character 80 enter the state where the cliff surface boarding target character 80 move on the cliff surface 75. If the process of step S380 is performed, the processor 81 ends the while-aboard-cliff-surface-character process in FIG. 26.

The above flow charts are mere illustrative, and therefore, the contents of the steps may be changed, or another step may be added, or some of the above steps may be omitted, or the order of the steps may be switched.

As described above, in the exemplary embodiment, on the premise that the player character 70 moves in the virtual space including terrains formed of the ground 71, the water surface 74, the cliff surface 75, and the like, a plurality of types of boarding target characters that the player character 70 can board are prepared. The plurality of types of boarding target characters include an air boarding target character capable of moving in the air, a ground boarding target character capable of moving on the ground, a water boarding target character capable of moving on water, and a cliff surface boarding target character capable of moving on the cliff surface.

If the ground boarding target character is selected among the plurality of types of boarding target characters based on the selection operation of the player and a boarding instruction is given, the player character 70 enters the state where the player character 70 can move on the ground aboard the ground boarding target character. If the water boarding target character is selected based on the selection operation and a boarding instruction is given, the player character 70 enters the state where the player character 70 can move on or in water aboard the water boarding target character. If the air boarding target character is selected based on the selection operation of the player and a boarding instruction is given, the player character 70 enters the state where the player character 70 can move in the air aboard the air boarding target character. When the player character 70 is in the air, if a predetermined operation input is provided, the player character 70 enters the state where the player character 70 can move in the air aboard the air boarding target character. While the player character 70 is aboard the air boarding target character, the player character 70 aboard the air boarding target character is moved in the air based on an operation input. While the player character 70 is aboard the air boarding target character, if the player character 70 aboard the air boarding target character moves toward the ground, the player character 70 is automatically changed to the state where the player character 70 is aboard the ground boarding target character, and the player character 70 enters the state where the player character 70 can move on the ground. While the player character 70 is aboard the air boarding target character, if the player character 70 aboard the air boarding target character moves toward the water surface, the player character 70 is automatically changed to the state where the player character 70 is aboard the water boarding target character, and the player character 70 enters the state where the player character 70 can move on or in water.

Consequently, in accordance with the area in the virtual space, it is possible to cause the player character 70 to board a plurality of types of boarding target objects and move the player character 70 in the virtual space. It is possible to provide various movement methods in the virtual space. Boarding target objects are automatically changed in accordance with the area where the player character 70 moves, whereby it is possible to achieve a smooth and seamless movement.

In the exemplary embodiment, when the player character 70 is on the ground, the air boarding target character is selected from among the plurality of boarding target characters by the selection operation, and the player character 70 is caused to board the air boarding target character in accordance with a boarding instruction. When the player character 70 is in the air, the player character 70 is caused to board the air boarding target character in accordance with a predetermined operation input (the pressing of the A-button). Consequently, when the player character 70 is in the air, it is possible to cause the player character 70 to board the air boarding target character by a simple operation. Thus, it is possible to prevent the player character 70 from falling to the ground and being damaged.

In the exemplary embodiment, when the player character 70 is in water, the player character 70 is caused to board the water boarding target character in accordance with a predetermined operation input (the pressing of the A-button). Consequently, when the player character 70 is in water, it is possible to cause the player character 70 to board the water boarding target character by a simple operation. Thus, it is possible to prevent the player character 70 from being damaged.

Variations

While image processing according to the exemplary embodiment has been described above, the exemplary embodiment is merely an example and may be modified as follows, for example.

For example, in the above exemplary embodiment, the player character 70 is caused to board a boarding target character. Alternatively, the player character 70 may be caused to board any boarding target object. The boarding target object may be not only the above character, but also an object such as a vehicle, an airplane, or a ship that the player character 70 can board.

In the above exemplary embodiment, when the player character 70 is in the normal state, for example, a boarding target character is selected by the selection operation using the button 33 or 36, and the player character 70 is caused to board the selected boarding target object in accordance with a boarding instruction using the plus button 57. In another exemplary embodiment, when the player character 70 is in the normal state, a boarding target object may be selected and a boarding instruction may be given by a single operation input. For example, a plurality of buttons may be associated with a plurality of boarding target objects, and when the player character 70 is in the normal state, the player character 70 may be caused to board a boarding target object relating to an operated button among the plurality of buttons.

In the above exemplary embodiment, for example, while the player character 70 is aboard the air boarding target character, if the player character 70 moves toward the ground, the air boarding target character is automatically changed to the ground boarding target character. Specifically, the air boarding target character is automatically changed to the character that the player character 70 has previously been aboard on the ground among a plurality of types of ground boarding target characters. In another exemplary embodiment, the air boarding target character may be automatically changed to a character preset among the plurality of types of ground boarding target characters. The player may set any of the plurality of types of ground boarding target characters in advance, and if the player character 70 aboard the air boarding target character moves toward the ground, the air boarding target character may be automatically changed to the character set in advance among the plurality of types of ground boarding target characters.

An operation input exemplified in the above exemplary embodiment is merely an example, and may be replaced by any other operation input. For example, an operation input using the button 33 or 36, a boarding instruction using the plus button 57, a selection operation for switching to the air boarding target character in the air, or the like may be performed by another button operation, or may be performed by a touch operation on a touch panel, or may be performed in accordance with the orientation of each controller or the game apparatus.

The above hardware configuration is merely an example, and the above game processing may be performed using any other hardware. The above game is merely an example, and the above processes regarding the boarding target objects may be performed in any other game.

Further, in the above exemplary embodiment, the above processing is performed by the main body apparatus 2 in the game system 1. Alternatively, the above processing may be executed by any other information processing apparatus (e.g., a personal computer, a smartphone, a tablet terminal, or a server) or the like. The above processing may be performed by an information processing system including a plurality of apparatuses, and a part or all of the above processing may be performed by any of the plurality of apparatuses.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program causing a computer of an information processing apparatus to provide execution comprising:
   controlling a player character in a virtual space based on a first operation input;
   in association with selecting, based on a selection operation, a boarding character that the player character can board and providing a boarding instruction, causing the player character to board the boarding character, selected based on the selection operation, and bringing the player character into a state where the player character can move, wherein
      the boarding character is selected among a plurality of types of characters that the player character owns, and
      the player character is configured to capture a character based on interaction with the character in the virtual space, and the captured character becomes owned in association with the player character;
   while the player character is in the air and in association with providing a second operation input different from the boarding instruction, causing the player character to board an air boarding character and bringing the player character into a state where the player character can move in the air; and
   while the player character is aboard the air boarding character, moving the player character, aboard the air boarding character, in the air based on a third operation input.

2. The non-transitory computer-readable storage medium having stored therein the game program according to claim 1, wherein
   the boarding character further includes a ground boarding character configured to move on the ground, and/or a water boarding character configured to move on or in water.

3. The non-transitory computer-readable storage medium having stored therein the game program according to claim 1, wherein
   the game program further causes the computer to provide execution comprising:
      causing damage to the player character in association with the player character falling from a height exceeding a first reference, or falling from the air toward the ground at a speed exceeding a second reference.

4. The non-transitory computer-readable storage medium having stored therein the game program according to claim 1, wherein the game program further causes the computer to provide execution comprising:
   generating, for display, a first visual object representing the boarding character and/or the air boarding character; and
   generating, for display, a second visual object representing the boarding character and/or the air boarding character.

5. The non-transitory computer-readable storage medium of claim 4, wherein the first visual object is displayed in a miniature form compared to the second visual object.

6. The non-transitory computer-readable storage medium of claim 4, wherein display of the first visual object is changed in association with a further selection operation.

7. The non-transitory computer-readable storage medium having stored therein the game program according to claim 1, wherein the player character is configured to switch from moving in the air aboard the air boarding character to moving on at least a ground of the virtual space, aboard the boarding character.

8. The non-transitory computer-readable storage medium having stored therein the game program according to claim 1, wherein the player character is configured to stop falling in the air while the player character is aboard the air boarding character.

9. The non-transitory computer-readable storage medium having stored therein the game program according to claim 1, wherein the player character is configured to battle the character or catch the character in the virtual space, and the caught character becomes owned in association with the player character.

10. The non-transitory computer-readable storage medium having stored therein the game program according to claim 1, further comprising displaying a selection image associated with the boarding character selected based on the selection operation.

11. The non-transitory computer-readable storage medium having stored therein the game program according to claim 10, wherein the player character is caused to board the air boarding character even when the displayed selection image is associated with the boarding character different from the air boarding character.

12. The non-transitory computer-readable storage medium having stored therein the game program according to claim 10, further comprising displaying a display object indicating the air boarding object, wherein the display object is different from the selection image.

13. An information processing apparatus, comprising:
processing circuitry including at least one processor; and
a display, wherein the processing circuitry is configured to:
control a player character in a virtual space based on a first operation input;
in association with selecting, based on a selection operation, a boarding character that the player character can board and providing a boarding instruction, cause the player character to board the boarding character, selected based on the selection operation, and bring the player character into a state where the player character can move, wherein
the boarding character is selected among a plurality of types of characters that the player character owns, and
the player character is configured to capture a character based on interaction with the character in the virtual space, and the captured character becomes owned in association with the player character;
in association with providing a second operation input while the player character is in the air, cause the player character to board an air boarding character and bringing the player character into a state where the player character can move in the air; and
while the player character is aboard the air boarding character, move the player character, aboard the air boarding character, in the air based on a third operation input.

14. A system, comprising:
a processor; and
a memory configured to store computer readable instructions that, when executed by the processor, cause the system to:
control a player character in a virtual space based on a first operation input;
in association with selecting, based on a selection operation, a boarding character boardable by the player character, and in association with providing a boarding instruction, cause the player character to board the boarding character, selected based on the selection operation, and enter a state in which the player character is movable, wherein
the boarding character is selected among a plurality of types of characters associated with the player character, and
the player character is configured to capture a character based on interaction with the character in the virtual space, and the captured character becomes associated with the player character;
in association with providing a second operation input while the player character is in the air, cause the player character to board an air boarding character and enter a state in which the player character is movable in the air; and
while the player character is aboard the air boarding character, move the player character in the air based on a third operation input.

15. The system of claim 14, wherein the player character boarding the boarding character includes the player character entering a state where the player character moves integrally with the boarding character.

16. The system of claim 14, wherein the player character boarding the boarding character includes a state where the player character rides the boarding character.

17. The system of claim 14, wherein the player character boarding the boarding character includes a state where the player character dangles from the boarding character.

18. The system of claim 14, wherein the player character boarding the boarding character includes a state where the player character holds on to the boarding character.

19. The system of claim 14, wherein the boarding character is selected among the plurality of types of characters obtained by the player character.

20. The system of claim 14, wherein damage to the player character is caused in association with the player character falling from a height exceeding a first reference, or falling from the air toward the ground at a speed exceeding a second reference.

21. A method for moving a player character implemented using an information processing system having at least one processor, the method comprising:
controlling a player character in a virtual space based on a first operation input;
in association with selecting, based on a selection operation, a first character boardable by the player character, and in assocation with inputting a boarding instruction, causing the player character to board the first character, selected based on the selection operation, and entering a state in which the player character is movable, wherein
the player character is configured to capture the first character based on interaction with the first character in the virtual space, and the captured first character becomes obtained by the player character;
in association with providing a second operation input while the player character is in the air, causing the player character to board a second character and entering a state in which the player character is movable in the air; and
moving the player character in the air, while the player character is aboard the second character, based on a third operation input.

22. The method of claim 21, wherein the first character includes a boarding character and the second character includes an air boarding character.

23. The method of claim 21, wherein the first character is selected among a plurality of types of characters obtained by the player character.

* * * * *